US012430084B2

(12) United States Patent
Hayashi et al.

(10) Patent No.: US 12,430,084 B2
(45) Date of Patent: Sep. 30, 2025

(54) INFORMATION PROCESSING APPARATUS AND CONTROL METHOD

(71) Applicant: CANON KABUSHIKI KAISHA, Tokyo (JP)

(72) Inventors: Kimio Hayashi, Tokyo (JP); Yoshiji Kanamoto, Tokyo (JP); Toshihiko Iida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/504,495

(22) Filed: Nov. 8, 2023

(65) Prior Publication Data

US 2024/0069822 A1 Feb. 29, 2024

Related U.S. Application Data

(63) Continuation of application No. PCT/JP2022/019641, filed on May 9, 2022.

(30) Foreign Application Priority Data

May 12, 2021 (JP) ................................ 2021-081299

(51) Int. Cl.
*G06F 15/00* (2006.01)
*G06F 3/12* (2006.01)

(52) U.S. Cl.
CPC .......... *G06F 3/1207* (2013.01); *G06F 3/1268* (2013.01)

(58) Field of Classification Search
CPC ............................ G06F 3/1207; G06F 3/1208
USPC ........................................................ 358/1.15
See application file for complete search history.

(56) References Cited

U.S. PATENT DOCUMENTS

| | | | | |
|---|---|---|---|---|
| 8,995,001 B1 * | 3/2015 | Koets | G06F 3/1288 358/1.15 |
| 2002/0046129 A1 * | 4/2002 | Nakagawa | G06Q 30/06 705/26.8 |
| 2017/0255430 A1 * | 9/2017 | Lahey | G06F 3/1275 |

FOREIGN PATENT DOCUMENTS

| | | |
|---|---|---|
| JP | 2001-230918 A | 8/2001 |
| JP | 2004-213378 A | 7/2004 |
| JP | 2008-167502 A | 7/2008 |
| JP | 2020-204792 A | 12/2020 |

OTHER PUBLICATIONS

Machine translation of Japanese Patent Document No. 2020-204792, Nozawa, Dec. 27, 2020. (Year: 2020).*
Machine translation of Japanese Patent Document No. 2008-167502, Doi et al. Jul. 17, 2008. (Year: 2008).*
PCT International Search Report mailed Jul. 26, 2022, in related PCT Application No. PCT/JP2022/019641.

* cited by examiner

*Primary Examiner* — Mark R Milia
(74) *Attorney, Agent, or Firm* — VENABLE LLP

(57) ABSTRACT

An information processing apparatus receives manuscript data associated with order data and acquires the number of manuscript data to be received in association with the order data. In addition, it is determined, based on the number of received manuscript data and the acquired number, whether the manuscript data associated with the order data have been received.

17 Claims, 31 Drawing Sheets

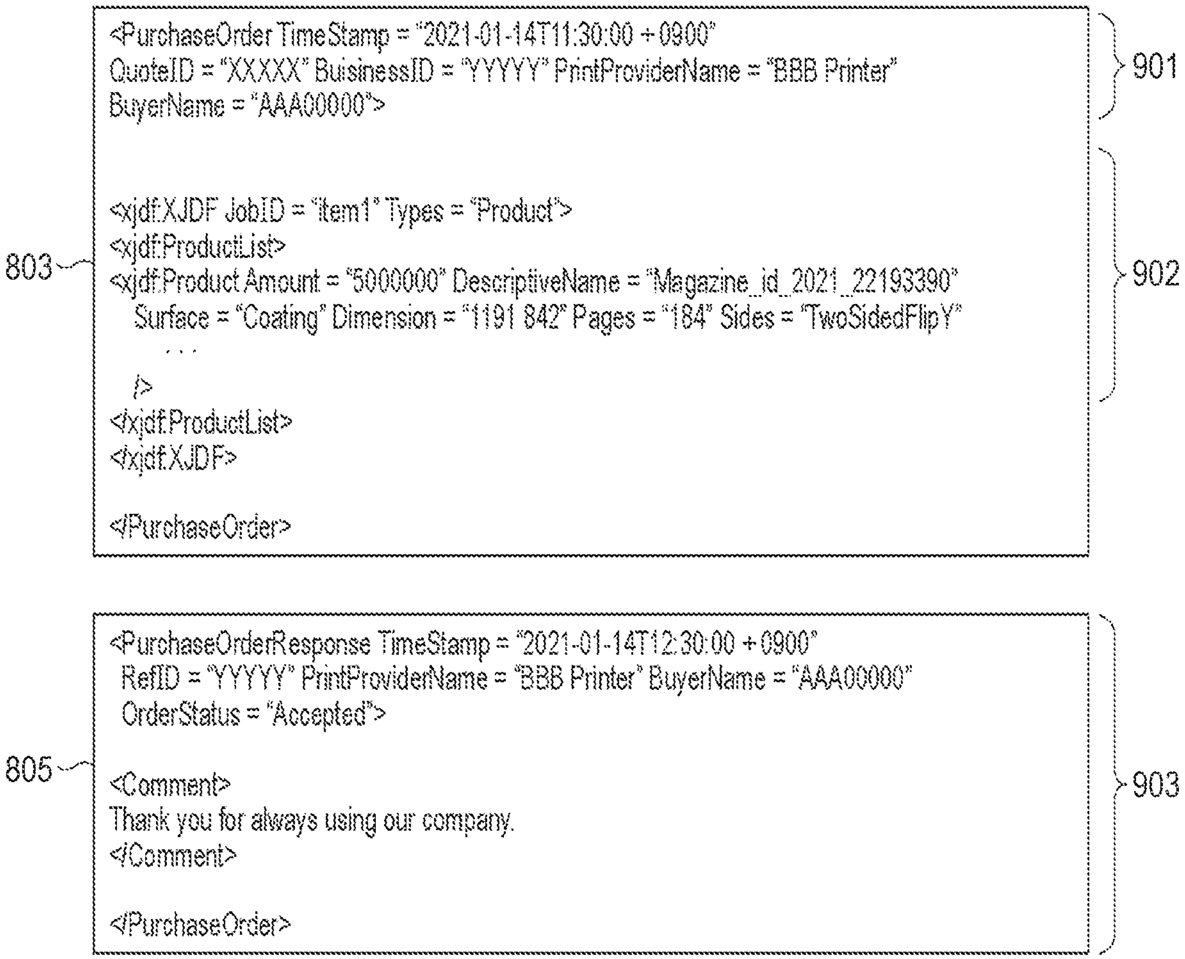

FIG. 9A

```
<PurchaseOrder TimeStamp = "2021-01-14T11:30:00 +0900"
 QuoteID = "XXXXX" BuisinessID = "YYYYY" PrintProviderName = "BBB Printer"
 BuyerName = "AAA00000">
```
⎫ 901

```
<xjdf:XJDF JobID = "item1" Types = "Product">
<xjdf:ProductList>
<xjdf:Product Amount = "5000000" DescriptiveName = "Magazine_id_2021_22193390"
   Surface = "Coating" Dimension = "1191 842" Pages = "184" Sides = "TwoSidedFlipY"
   . . .
  />
</xjdf:ProductList>
</xjdf:XJDF>

</PurchaseOrder>
```
803 — ⎫ 902

```
<PurchaseOrderResponse TimeStamp = "2021-01-14T12:30:00 +0900"
 RefID = "YYYYY" PrintProviderName = "BBB Printer" BuyerName = "AAA00000"
 OrderStatus = "Accepted">

<Comment>
Thank you for always using our company.
</Comment>

</PurchaseOrder>
```
805 — ⎫ 903

```
<ContentDelivery TimeStamp = “2021-01-15T12:15:00 + 0900”
BuisinessID = “YYYYY” PrintProviderName = “BBB Printer” BuyerName = “AAA00000”
UpdateMethod = “Add” Amount = “2” ActualAmount = “1”>


<xjdf:XJDF JobID = “item1” Types = “Product Delivery”>
<xjdf:ResourceSet Name = “RunList” Usage = “Input”>
<xjdf:Resource>
<xjdf:RunList>
<xjdf:FileSpec MimeType = “Application/pdf” URL = “file:///808Content3.pdf”/>
</xjdf:RunList>
</xjdf:Resource>
</xjdf:ResourceSet>
</xjdf:XJDF>

</ContentDelivery>
```

904 905

808

```
<ContentDeliveryResponse TimeStamp = “2021-01-15T13:30:00 + 0900”
 RefID = “YYYYY” PrintProviderName = “BBB Printer” BuyerName = “AAA00000”
 Result = “AcceptedWaiting”>

<xjdf:XJDF JobID = “item1” File = “Content3.pdf”>
<xjdf:ResourceSet Name = “AuditPool”>
<xjdf:Resource>
<xjdf:AuditPool>
<xjdf:PreFlightReport Result = “success”>
</xjdf:AuditPool>
</xdf:Resource>
</xjdf:ResourceSet>
</xjdf:XJDF>

</ContentDelivery>
```

```
<ContentDelivery TimeStamp = "2021-01-17T08:00:00 + 0900"
BuisinessID = "YYYYY" PrintProviderName = "BBB Printer" BuyerName = "AAA00000"
UpdateMethod = "Add" Amount = "2" ActualAmount = "2">


<xjdf: XJDF JobID = "item1" Types = "Product Delivery">
<xjdf:ResourceSet Name = "RunList" Usage = "Input">
<xjdf:Resource>
<xjdf:RunList>
<xjdf:FileSpec MimeType = "Application/pdf" URL = "file:///Content3.pdf"/>
</xjdf:RunList>
</xjdf:Resource>
</xjdf:ResourceSet>
</xjdf:XJDF>

</ContentDelivery>
```

909

811

```
<ContentDeliveryResponse TimeStamp = "2021-01-15T13,30,00+0900"
 RefID = "YYYYY" PrintProviderName = "BBB Printer" BuyerName = "AAA00000"
 Result = "Accepted">

<xjdf:XJDF JobID = "item1" File = "Content3.pdf" >
<xjdf:ResourceSet Name = "AuditPool">
<xjdf:Resource>
<xjdf:AuditPool>
<xjdf:PreFlightReport Result = "success">
</xJdf:AuditPool>
</xjdf:Resource>
</xjdf:ResourceSet>
</xjdf:XJDF>

</ContentDelivery>
```

```
<ContentDelivery TimeStamp = "2021-01-15T12:15:00+0900"
BuisinessID = "YYYYY" PrintProviderName = "BBB Printer" BuyerName = "AAA00000"
UpdateMethod = "Add" Amount = "5" ActualAmount = "2">


<xjdf:XJDF JobID = "item1" Types = "Product Delivery">
<xjdf:ResourceSet Name = "RunList" Usage = "Input">
<xjdf:Resource>
<xjdf:RunList>
<xjdf:FileSpec MimeType = "Application/pdf" URL = "file:///Contnt3.pdf"/>
</xjdf:RunList>
</xjdf:Resource>
</xjdf:ResourceSet>
</xjdf:XJDF>

</ContentDelivery>
```

911

811

```
<ContentDeliveryResponse TimeStamp = "2021-01-15T13:30:00+0900"
  RefID = "YYYYY" PrintProviderName = "BBB Printer" BuyerName = "AAA00000"
  Result = "AcceptedWaiting">

<xjdf:XJDF JobID = "item1" File = "Content3.pdf" >
<xjdf:ResourceSet Name = "AuditPool">
<xjdf:Resource>
<xjdf:AuditPool>
<xjdf:PreFlightReport Result = "success">
</xjdf:AuditPool>
</xjdf:Resource>
</xjdf:ResourceSet>
</xjdf:XJDF>

</ContentDelivery>
```

FIG. 9E 806, 912, 913

```
<ContentDelivery TimeStamp = "2021-01-15T12:15:00 + 0900"
BuisinessID = "YYYYY" PrintProviderName = "BBB Printer" BuyerName = "AAA00000"
UpdateMethod = "Add>


<xjdf:XJDF JobID = "item1" Types = "Product Delivery">
<xjdf:ResourceSet Name = "RunList" Usage = "Input">
<xjdf:Resource>
<xjdf:RunList>
<xjdf:FileSpec MimeType = "Application/pdf" URL = "file:///Content3.pdf"/>
</xjdf:RunList>
<xjdf:RunList>
<xjdf:FileSpec MimeType = "Application/pdf" URL = ""/>
</xjdf:RunList>
</xjdf:Resource>
</xjdf:ResourceSet>
</xjdf:XJDF>

</ContentDelivery>
```

808, 914

```
<ContentDeliveryResponse TimeStamp = "2021-01-15T13:30:00 + 0900"
 RefID = "YYYYY" PrintproviderName = "BBB Printer" BuyerName = "AAA00000"
 Result = "AcceptedWaiting">

<xjdf:XJDF JobID = "item1" File = "Content3.pdf" >
<xjdf:ResourceSet Name = "AuditPool">
<xjdf:Resource>
<xjdf:AuditPool>
<xjdf:PreFlightReport Result = "success">
</xjdf:Audit Pool>
</xjdf:Resource>
</xjdf:ResourceSet>
</xjdf:XJDF>

</ContentDelivery>
```

FIG. 9F 809, 915

```
<ContentDelivery TimeStamp = "2021-01-15T12:15:00 + 0900"
BuisinessID = "YYYYY" PrintProviderName = "BBB Printer" BuyerName = "AAA00000"
UpdateMethod = "Add>


<xjdf:XJDF JobID = "item1" Types = "Product Delivery">
<xjdf:ResourceSet Name = "RunList" Usage = "Input">
<xjdf:Resource>
<xjdf:RunList>
<xjdf:FileSpec MimeType = "Application/pdf" URL = "file:///Content3.pdf"/>
</xjdf:RunList>
<xjdf:RunList>
<xjdf:FileSpec MimeType = "Application/pdf" URL = "file:///Content4.pdf"/>
</xjdf:RunList>
</xjdf:Resource>
</xjdf:ResourceSet>
</xjdf:XJDF>

</ContentDelivery>
```

811, 916

```
<ContentDeliveryResponoe TimeStamp = "2021-01-15T13:30:00 + 0900"
  RefID = "YYYYY" PrintProviderName = "BBB Printer" BuyerName = "AAA00000"
  Result = "Accepted">

<xjdf:XJDF JobID = "item1" File = "Content3.pdf" >
<xjdf:ResourceSet Name = "AuditPool">
<xjdf:Resource>
<xjdf:AuditPool>
<xjdf:PreFlightReport Result = "success">
</xjdf:AuditPool>
</xjdf:Resource>
</xjdf:ResourceSet>
</xjdf:XJDF>

</ContentDelivery>
```

FIG. 9G 917, 918

```
{
    {"BusinessID" : "AAAA", "Amount" : "10", "BuyerName":"xyz"},
    {"BusinessID" : "YYYY", "Amount" : "2", "BuyerName":"AAAA00000"}
}
```

```
<ContentDelivery TimeStamp = "2021-01-15T12:15:00 +0900"
BuisinessID = "YYYYY" PrintProviderName = "BBB Printer" BuyerName = "AAA00000"
UpdateMethod = "Add>


<xjdf:XJDF JobID = "item1" Types = "Product Delivery">
<xjdf:ResourceSet Name = "RunList" Usage = "Input">
<xjdf:Resource>
<xjdf:RunList>
<xjdf:FileSpec MimeType = "Application/pdf" URL = "file:///Content3.pdf"/>
</xjdf:RunList>
<xjdf:RunList>
<xjdf:FileSpec MimeType = "Application/pdf" URL = "file:///Content4.pdf"/>
</xjdf:RunList>
</xjdf:Resource>
</xjdf:ResourceSet>
</xjdf:XJDF>

</ContentDelivery>
```

808 — 921

```
<ContentDeliveryResponse TimeStamp = "2021-01-15T13:30:00 + 0900"
  RefID = "YYYYY" PrintProviderName = "BBB Printer" BuyerName = "AAA00000"
  Result = "Accepted Waiting">

<xjdf:XJDF JobID = "item1" File = "Content3.pdf" >
<xjdf:ResourceSet Name = "AuditPool">
<xjdf:Resource>
<xjdf:AuditPool>
<xjdf:PreFlightReport Result = "success">
</xjdf:AuditPool>
</xdf:Resource>
</xjdf:ResourceSet>
</xjdf:XJDF>

</ContentDelivery>
```

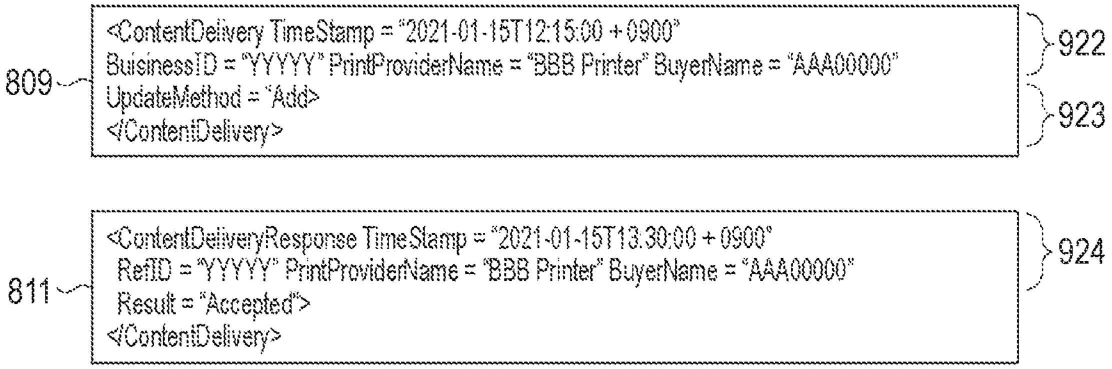

FIG. 9I

809 — 
```
<ContentDelivery TimeStamp = "2021-01-15T12:15:00 +0900"    ⎫ 922
 BuisinessID = "YYYYY" PrintProviderName = "BBB Printer" BuyerName = "AAA00000"
 UpdateMethod = "Add>                                       ⎫ 923
</ContentDelivery>
```

811 — 
```
<ContentDeliveryResponse TimeStamp = "2021-01-15T13:30:00 +0900"  ⎫ 924
 RefID = "YYYYY" PrintProviderName = "BBB Printer" BuyerName = "AAA00000"
 Result = "Accepted">
</ContentDelivery>
```

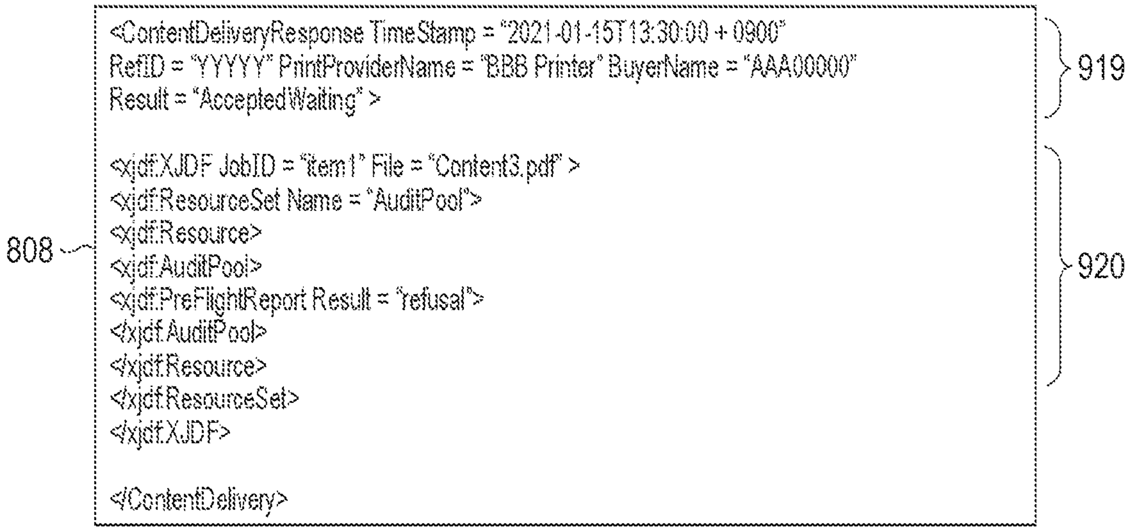

FIG. 9J

808 —
```
<ContentDeliveryResponse TimeStamp = "2021-01-15T13:30:00 +0900"    ⎫ 919
 RefID = "YYYYY" PrintProviderName = "BBB Printer" BuyerName = "AAA00000"
 Result = "AcceptedWaiting" >

<xjdf:XJDF JobID = "Item1" File = "Content3.pdf" >                  ⎫ 920
<xjdf:ResourceSet Name = "AuditPool">
<xjdf:Resource>
<xjdf:AuditPool>
<xjdf:PreFlightReport Result = "refusal">
</xjdf:AuditPool>
</xjdf:Resource>
</xjdf:ResourceSet>
</xjdf:XJDF>

</ContentDelivery>
```

| Business ID | Timestamp | Amount | Actual Amount |
|---|---|---|---|
| 100 | 2021-01-15T12:20 | 2 | 1 |

1201

| Business ID | Timestamp | Amount | Actual Amount |
|---|---|---|---|
| 100 | 2021-01-15T16:20 | 2 | 2 |

| Business ID | Timestamp | Amount | Actual Amount |
|---|---|---|---|
| 200 | 2021-01-15T12:15 | 2 | 1 |

1203

| Business ID | Timestamp | Amount | Actual Amount |
|---|---|---|---|
| 200 | 2021-01-15T12:15 | 2 | 1 |
| 200 | 2021-01-15T15:00 | 5 | 2 |

| External system | | | | | | | |×| 1300
|---|---|---|---|---|---|---|---|---|
| | | | | | | | | |
| | Business ID | YYYYY | | | | | | ⎫
| | Amount | 2 | | | | | | ⎬ 1301
| | Buyer name | AAA00000 | | | | | | ⎭
| | | | | | | | Save | 1302
| | | | | | | | | |
| | | | | | | | | |

| External system | | | | | | |×| 1303
|---|---|---|---|---|---|---|---|
| Business ID | Amount | Buyer name | | | | | |
| AAAA | 10 | xyz | | | | | |
| YYYY | 2 | AAA00000 | | | | | 1304
| | | | | | | | |

FIG. 15A

| PRODUCT NAME | SIMPLEX/DUPLEX | NUMBER OF MANUSCRIPT DATA |
|---|---|---|
| BUSINESS CARD | SIMPLEX | 1 |
| BUSINESS CARD | DUPLEX | 2 |
| ALBUM | SIMPLEX | 2 |
| ALBUM | DUPLEX | 4 |

FIG. 15B

| PRODUCT NAME | JACKET | NARROW PAPER BAND AROUND JACKET | NUMBER OF MANUSCRIPT DATA |
|---|---|---|---|
| BOOKLET | YES | YES | 3 |
| BOOKLET | YES | NO | 2 |
| BOOKLET | NO | NO | 1 |

INFORMATION PROCESSING APPARATUS AND CONTROL METHOD

CROSS-REFERENCE TO RELATED APPLICATIONS

This application is a Continuation of International Patent Application No. PCT/JP2022/019641 filed on May 9, 2022, which claims the benefit of Japanese Patent Application No. 2021-081299, filed on May 12, 2021, both of which are hereby incorporated by reference herein in their entirety.

BACKGROUND OF THE INVENTION

Field of the Invention

The present invention relates to a technique for transmitting and receiving printing products.

Description of the Related Art

In the field of the commercial printing, customer's demands for electric orders such as a web order and electric transmission when requesting a printing agent to produce printing products, and demands for a system provided by a printing agent have been increasing in recent years.

In response to these demands, some printing companies have disclosed order systems configured based on web systems. Further, standard specifications of electronic transaction data for the purpose of sharing various commands and information to be exchanged in order operations, such as PrintTalk, have been studied to avoid each company having order systems and order receiving systems different from each other.

Japanese Patent Application Laid-Open No. 2004-213378 discloses a system for ordering printing products and for transmitting a manuscript using an electronic transmission management server and a requesting terminal.

Although Japanese Patent Application Laid-Open No. 2004-213378 discloses a system for submitting a manuscript data at the time of ordering, it is not considered that the manuscript data is sent after ordering. Therefore, for example, in case where multiple manuscript data can be accepted and manuscript data is sent after an order, the printing agent cannot determine whether all manuscript data have been received. Therefore, the printing agent cannot start a process (e.g., a print process) that starts after receiving all the manuscript data, and the printing agent cannot transmit information indicating that all the manuscript data have been received to the customer.

The present invention has been made in view of the above-described problem. That is, it is an objective of the present invention to provide a technique that allows to determine whether or not a printing agent has received all of the manuscript data.

SUMMARY OF THE INVENTION

In order to solve the above-described problem, an information processing apparatus according to the present invention comprises: receiving means for receiving manuscript data associated with order data; acquiring means for acquiring the number of manuscript data to be received in association with the order data; and determining means for determining, based on the number of the received manuscript data and the acquired number, whether all of the manuscript data associated with the order data have been received.

Further features of the present invention will become apparent from the following description of exemplary embodiments with reference to the attached drawings.

BRIEF DESCRIPTION OF THE DRAWINGS

FIG. 9A shows an example (part one) of a command and a response transmitted and received between the customer system and the printing agent system.

FIG. 9B shows an example (part one) of a command and a response transmitted and received between the customer system and the printing agent system.

FIG. 9C shows an example (part two) of a command and a response transmitted and received between the customer system and the printing agent system.

FIG. 9D shows an example (part two) of a command and a response transmitted and received between the customer system and the printing agent system.

FIG. 9E shows an example (part three) of a command and a response transmitted and received between the customer system and the printing agent system.

FIG. 9F shows an example (part three) of a command and a response transmitted and received between the customer system and the printing agent system.

FIG. 9G shows an example (part four) of a command and a response transmitted and received between the customer system and the printing agent system.

FIG. 9H shows an example (part four) of a command and a response transmitted and received between the customer system and the printing agent system.

FIG. 9I shows an example (part five) of a command and a response transmitted and received between the customer system and the printing agent system.

FIG. 9J shows an example (part five) of a command and a response transmitted and received between the customer system and the printing agent system.

FIG. 12A is a schematic diagram of a management table for storing the number of manuscript data.

FIG. 12B is a schematic diagram of a management table for storing the number of manuscript data.

FIG. 15A is a table of the number of manuscript data.

FIG. 15B is a table of the number of manuscript data.

DESCRIPTION OF THE EMBODIMENTS

Hereinafter, descriptions of embodiments will be given for carrying out the present invention with reference to the drawings. The following embodiments do not limit the invention as in the claims, and all combinations of features described in the embodiments are not necessarily essential to the means for solving the objective of the present invention.

First Embodiment

Figure 1:
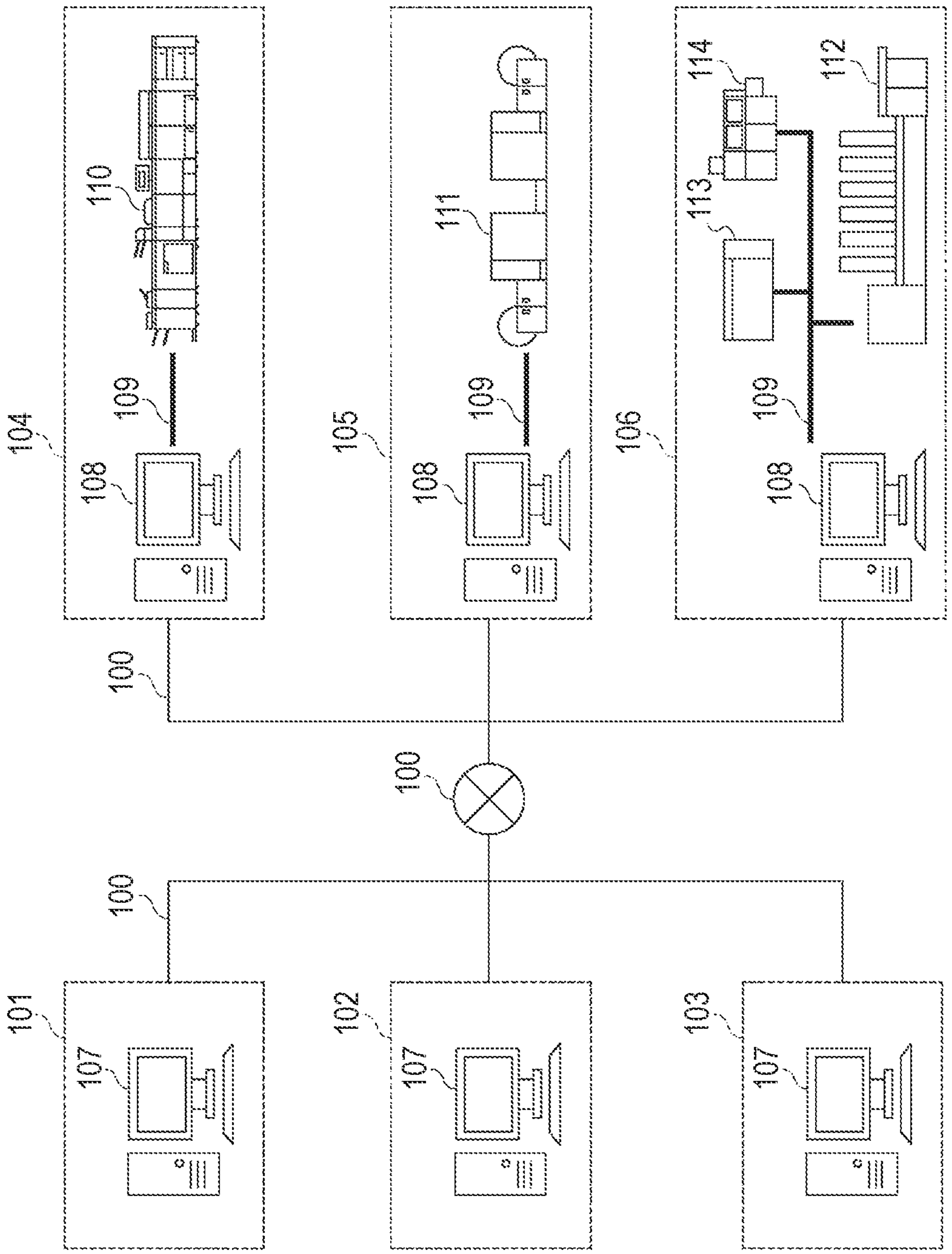
FIG. 1 is a block diagram showing the whole of a customer system and a printing agent system.

FIG. 1 is a block diagram showing an order system according to the present embodiment.

The system is roughly divided into customer systems (101, 102, 103) and printing agent systems (104, 105, 106), and these systems are interconnected by the Internet 100. The customer systems (101, 102, 103) include at least one information processing device 107. Hereinafter, the customer system 101 and the printing agent system 104 are described as an example, but the customer system 101 may be the customer system 102 or the customer system 103, and the customer system 101 may be configured by multiple customer systems. The printing agent system 104 may be the printing agent system 105 or the printing agent system 106, and the printing agent system 104 may be configured by multiple printing agent systems.

The internal configuration of the printing agent system 104 is described in detail below. As shown in FIG. 1, multiple devices are interconnected by a network 109. As the multiple devices, an information processing apparatus 108, image forming apparatuses (110, 111, 112), a laminator 114, an CTP 113, and the like are connected to each other.

The image forming apparatus 110 is a cut sheet type digital printing machine. The image forming apparatus 111 is a digital printing machine for continuous form sheets. The image forming apparatus 112 is an offset type printing machine. Printing companies usually have multiple devices possessing different properties, select an optimal image forming apparatus in consideration of various conditions such as contents of orders, number of products, unit price of products, quality of products, and the like, and perform production.

Each apparatus is controlled under a workflow software group running on the information processing apparatus 108, processes electronic transaction data (order data or ordering data) received from the customer system 101, also processes the received manuscript data, and produces printing products.

The transmission and reception of requests related to orders of printing products from the customer system 101 to the printing agent system 104 is achieved by transmitting and receiving common electronic formats to and from each other via the Internet 100.

Figure 2:
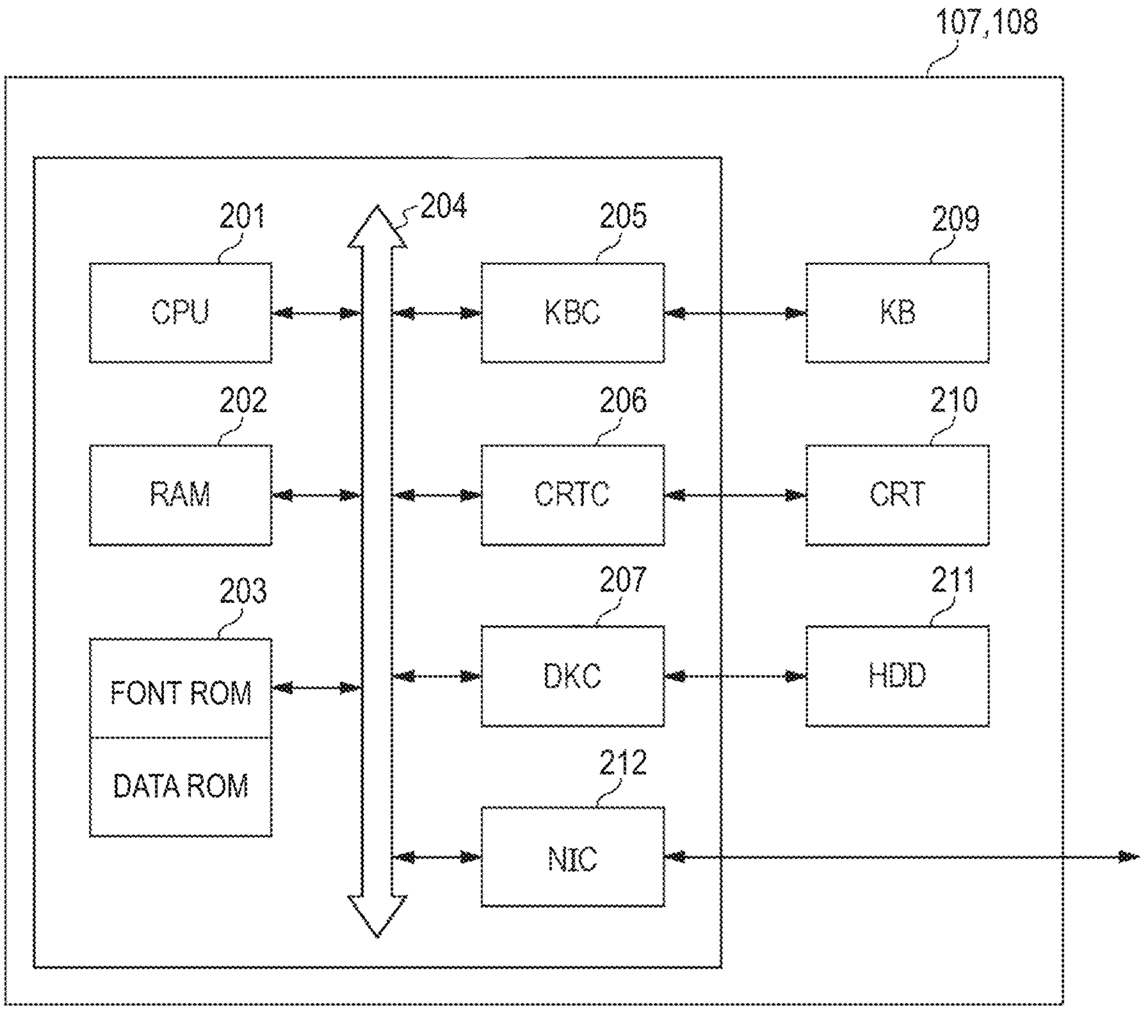
FIG. 2 is a hardware configuration diagram of an information processing apparatus.

FIG. 2 is a block diagram showing a configuration of the information processing apparatus (107, 108).

As shown in FIG. 2, a CPU 201 executes an OS or a general application program stored in a program ROM included in a ROM 203, or executes an OS or a general application program loaded from a HDD 211 to a RAM 202. The ROM 203 includes a font ROM and a data ROM. The RAM 202 functions as a main memory, a work area, and the like of the CPU 201. A keyboard controller (KBC) 205 controls inputs from a keyboard 209 and a pointing device (not shown). A display controller CRTC 206 controls display on a display unit CRT 210. A disk controller (DKC) 207 controls accesses to an HDD 211 or the like that stores a boot program, various applications, font data, and the like. A network controller (NIC) 212 is connected to a network and controls communications with other devices connected to the network. A bus 204 interconnects the CPU 201, the RAM 202, the ROM 203, and the controllers, and conveys data signals and control signals.

In a case of a mobile terminal, the above configuration may include a touch panel controller or the like instead of the keyboard controller (KBC) 205. The above configuration may also include a mass storage device instead of the HDD 211. When an apparatus including the network controller (NIC) 212 is connected to a wired LAN, a wireless LAN, or both, the network controller (NIC) 212 has different internal configurations. However, the difference in the internal configuration is hidden within the network controller (NIC) 212, and the system is controlled as being equivalent for the other modules shown in FIG. 2.

Figure 3:
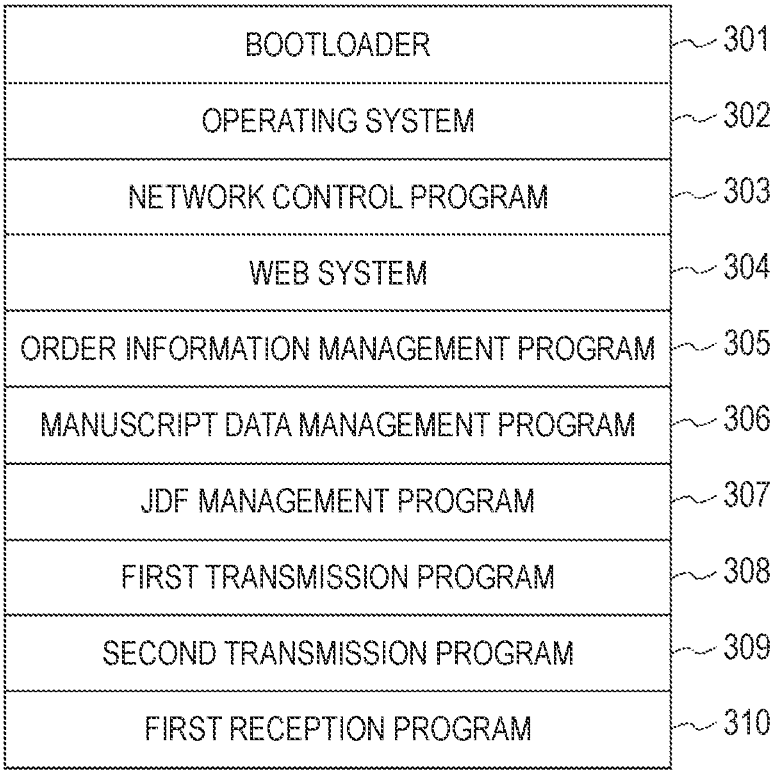
FIG. 3 is a software configuration diagram of a first information processing apparatus.

FIG. 3 shows an example of a configuration of a program included in the information processing apparatus 107 of the customer system 101.

A boot loader 301 is a program executed immediately after the power of the information processing apparatus 107 is turned on. The program includes a program for executing various activation sequences necessary for activating the system.

An operating system 302 is a program for providing an execution environment of various programs that realize the functions of the information processing apparatus 102. The operating system 302 provides functions such as resource management of memories of the information processing apparatus, i.e., the ROM 203, the RAM 202, and the HDD 211.

A network control program 303 is executed when data is transmitted to and received from a device connected via a network. That is, the network control program 303 is software used for controlling the NIC 212 to transmit and receive data and files to and from the outside via the Internet 100.

A web system 304 is a program for receiving web-based services from an external device connected via a network or for transmitting data and commands to an external web service.

An order information management program 305 provides, for the printing agent system 104 receiving an order of printing products, means for sending a request related to the order via various commands, means for receiving and interpreting a response as a result of sending the request, and instructing means for allowing an operator to execute the various commands.

A manuscript data management program 306 is used to manage original data of printing products ordered, i.e., document image data. In case of only holding the document image data until the document image data is transmitted, functions of the file system included in the operating system 302 can be used. However, in the present embodiment, the manuscript data management program 306 includes programs used for processing data, generating contents, editing contents, and the like.

A JDF management program 307 is used to generate a file in a JDF format for electronically defining a specification of the product, edit the file, and the like when ordering the printing products to the printing agent system 104. The JDF information edited or created by the program is transmitted by the order information management program 305 to the printing agent system 104 when ordering to produce the product.

A first transmission program 308 performs transmission processing of various commands transmitted from the customer system 101 to the printing agent system 104 in the ordering process. After an order command among the various commands to be transmitted by the first transmission program 308 is transmitted and accepted, a second transmission program 309 transmits manuscript data as data to be printed. A first reception program 310 receives response data, which is a result of the processed command and data transmitted to the printing agent system 104 by the first transmission program 308 and the second transmission program 309, and analyzes the received data.

Figure 4:
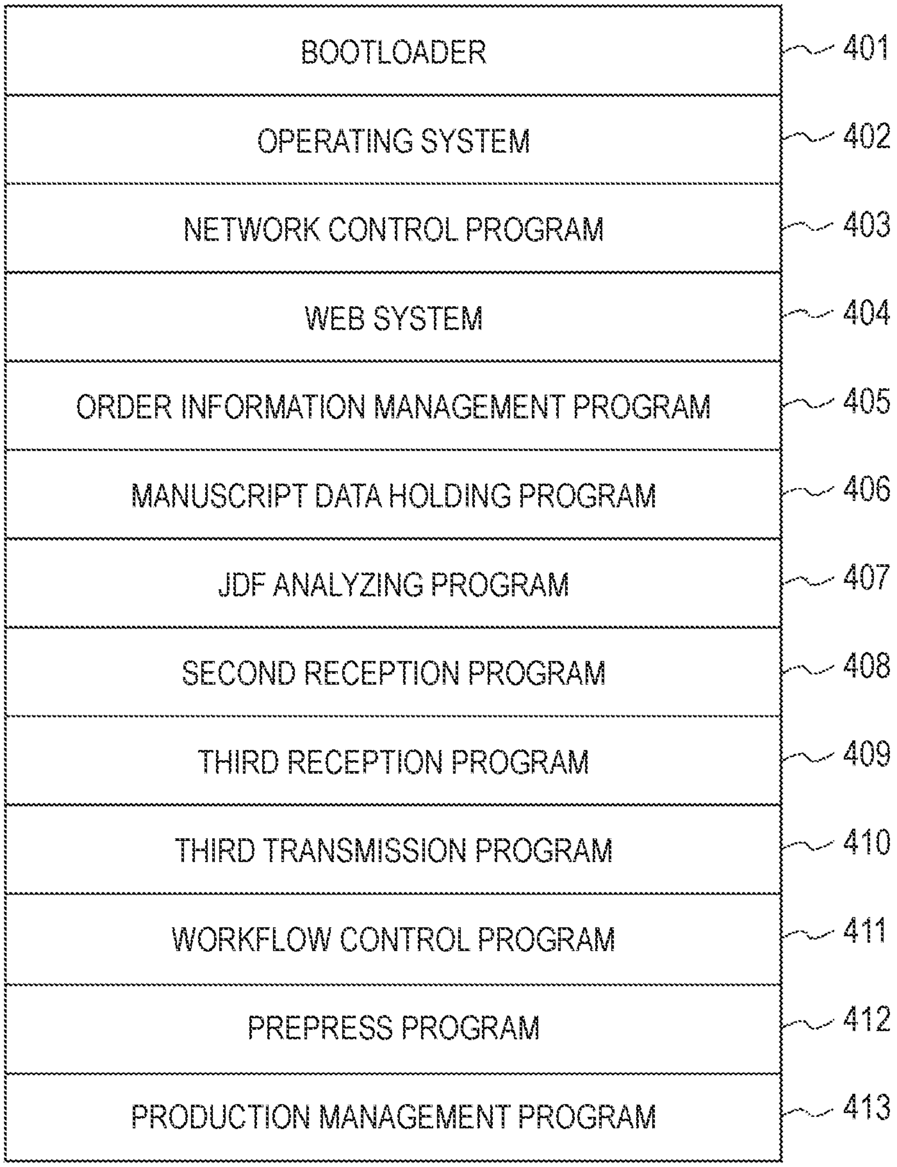
FIG. 4 is a software configuration diagram of a second information processing apparatus.

FIG. 4 shows a configuration of a program included in the information processing apparatus 108 of the printing agent system 104.

The roles and processes executed by a boot loader 401, an operating system 402, a network control program 403, and a web system 404 are the same as the roles and processes described above with reference to FIG. 3.

An order information management program 405 provides means for receiving a request related to an order of printing products via various commands, for transmitting a response as a result of the reception, and instructing means for causing an operator to execute the various commands.

Figure 11:
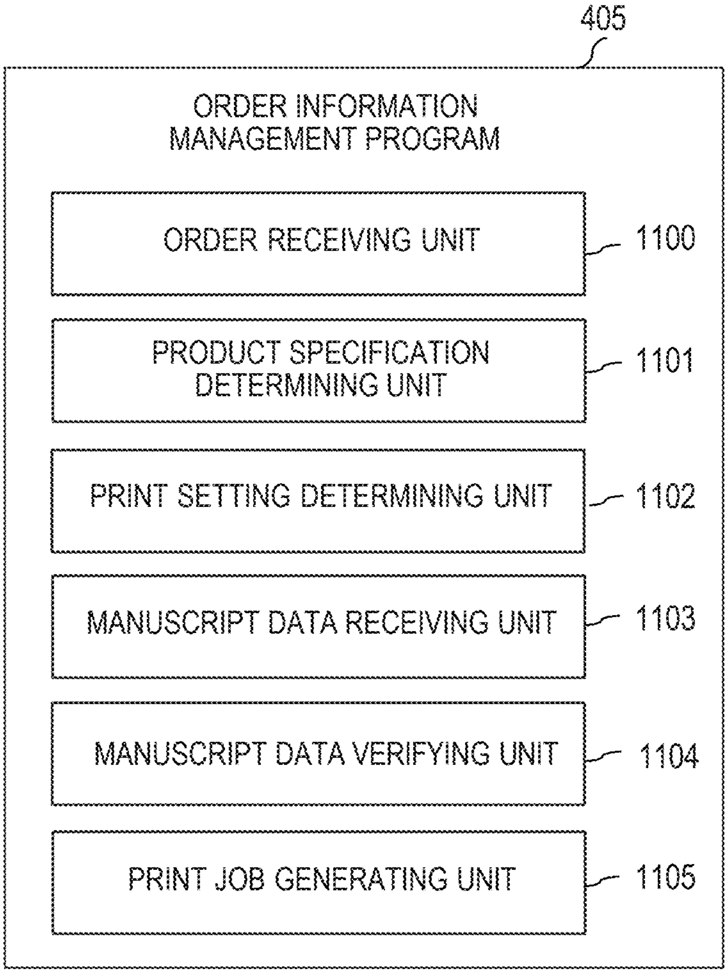
FIG. 11 is a diagram of functional blocks of an order information management program.

As shown in FIG. 11, the order information management program 405 includes multiple functional blocks. FIG. 11 shows a functional block diagram of the order information management program. An order receiving unit 1100 receives a request for producing printed matters via electronic transaction data (order data or ordering data). A product specification determining unit 1101 analyzes the electronic transaction data and determines the specification of the generated printed matter. A print setting determining unit 1102 determines print settings based on product specifications. A manuscript data receiving unit 1103 receives manuscript data associated with the electronic transaction data (order data, ordering data). A manuscript data verifying unit 1104 verifies whether or not all of the manuscript data have been received. A print job generating unit 1105 generates a print job based on the print setting and the manuscript data.

A manuscript data holding program 406 is used to manage image data to be printed received from the customer system 101. When a request to add a manuscript or a request to replace a manuscript is received from the customer system 101, the manuscript data holding program 406 is used to determine whether or not to accept the request.

A JDF analyzing program 407 is used for receiving a JDF format file that electronically defines a specification of the product when receiving an order of the printing products from the customer system 101, and analyzing contents of the file. Preconditions required to execute production, such as a specification, the number of copies, and a medium of products, which are obtained based on information included in the JDF file, are used when, for example, presetting of a workflow, production planning, and the like are performed.

A second reception program 408 is used to receive various commands transmitted by the first transmission program 308 shown in FIG. 3. A third reception program 409 is used for receiving the manuscript data transmitted by the second transmission program 309 shown in FIG. 3. A third transmission program 410 is used for transmitting a result received by the second reception program 408 and the third reception program 409 as a response to the first reception program 310 of FIG. 3 in the customer system 101.

A workflow control program 411 is used to centrally manage processing among devices connected via the network 109 in the printing agent system 104, control among the devices, execution of jobs, and the like.

The workflow control program 411 defines processes necessary for producing the requested products based on contents of the order held and managed by the JDF analysis program and the received manuscript data. The workflow control program 411 generates, maintains, and manages jobs in a workflow. Executing jobs for each process in the workflow allows to produce printing products.

A prepress program 412 is used for executing a preprocessing step for printing, such as imposition or data format conversion, on the manuscript data. The prepress program 412 is executed based on an instruction from the workflow control program 410.

A production management program 413 is used to create a production plan based on contents of the received commands or the received manuscript data, and to instruct the workflow control program 411 to execute jobs for each process in the workflow based on the production plan.

FIGS. 5A to 5E show examples of operation screens displayed by the order information management program 305 shown in FIG. 3 that is executed by the information processing apparatus 107 in the customer system 101.

Figure 5A:
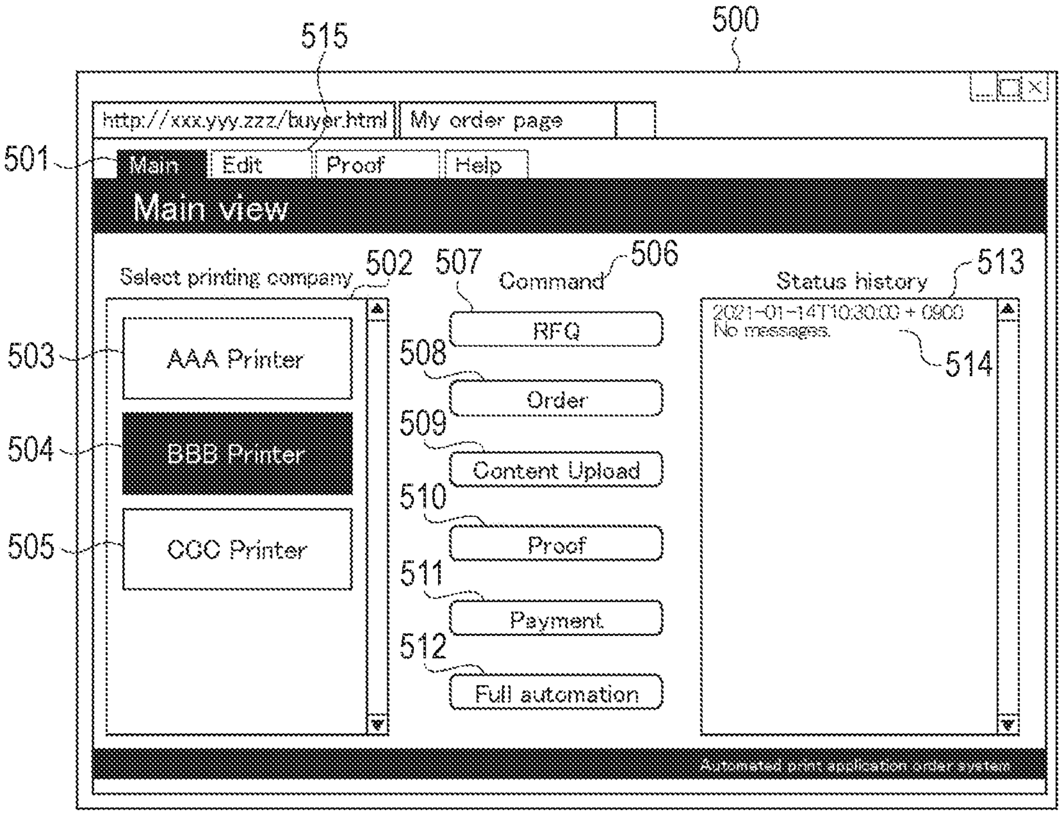
FIG. 5A is a screen example (part one) in the customer system.

FIG. 5A shows a state in which an order setting main tab 501 is selected from a main screen 500 of the order information management program 305 of the present embodiment. In an example shown in FIG. 5A, a printing agent selecting section 502 is presented, and a first printing agent (503), a second printing agent (504), and a third printing agent (505) are displayed. A customer can select a printing agent that performs the order processing from the candidates. In addition, the order information management program 305 according to the present embodiment is configured to be able to add and delete a printing agent that can accept a request of an order on a printing agent management screen (not shown). Further, the example of FIG. 5A shows a case where the second printing agent (504) is selected for the order.

In a command selection section 506, multiple command selection means are provided for transmitting various processing relating to the order of printing products from the customer system 101 to the printing agent system 104.

An estimate request command issuing means 507 is used for giving an instruction to transmit a command for requesting an estimate of a cost required for producing printing products to the printing agent selected by the printing agent selecting section 502. When the estimate request command issuing means 507 is pressed, the screen displayed is switched to a screen for inputting various kinds of information necessary for a request of an estimate (not shown), and the printing agent uses the screen to input information necessary for issuing an estimate request command.

An order request command issuing means 508 instructs to transmit an order command including information contained in the estimate information and setting information of the specification of the products edited by JDF editing means 515, to the printing agent selected by the printing agent selecting section 502. When the order request command issuing means 508 is selected, the command including contents of the order is transmitted to the second printing agent 504 which is the selected printing agent.

A manuscript data transmitting means 509 instructs the customer system 101 to transmit manuscript data to be printed to the printing agent system 104. The system according to the present embodiment is configured such that the transmission processing by this means can be executed after the order processing by the order request command issuing means 508. However, it is needless to say that a configuration in which data transmission processing can be executed at the same time as order processing can also be adopted.

According to the present embodiment, the order processing and the data transmission processing may be executed at different timings. As shown in FIG. 5A, the order request command issuing means 508 and the manuscript data transmitting means 509 are provided as separate means.

A proof requesting means 510 is used for transmitting a command for requesting trial printing based on manuscript data and producing conditions necessary for production of the printing products transmitted by the order request command issuing means 508 and the manuscript data transmitting means 509. If customers perform the proof process by themselves, this means becomes unnecessary.

A payment execution means 511 is used for instructing transmission of a command for payment of products produced by the printing agent system 104 via various means such as the order request command issuing means 508, the manuscript data transmitting means 509, and the proof requesting means 510. At the time of the payment, it is assumed in the system of the present embodiment that the amount is calculated based on the amount information acquired as a result of the execution of the processing by the estimate request command issuing means 507, and the payment processing is mainly performed by the electronic means. However, similar information may be automatically generated, selected, presented, and stored by full automation means 512 based on conditions such as states of orders or contents of commands exchanged between the customer system 101 and the printing agent system 104.

A status confirmation section 513 transmits a command executed via the command selection section 506 from the customer system 101 to the printing agent system 104, and displays contents of a response that corresponds to a result of the command executed by the printing agent system 104 upon receipt of the command.

In the example shown in FIG. 5A, the customer system 101 just is selecting the second printing agent 504, and no command has been executed via the command selection section 506. Therefore, the first status (514) indicates that no processing is performed at 10:30 on Jan. 14, 2021.

Figure 5B:
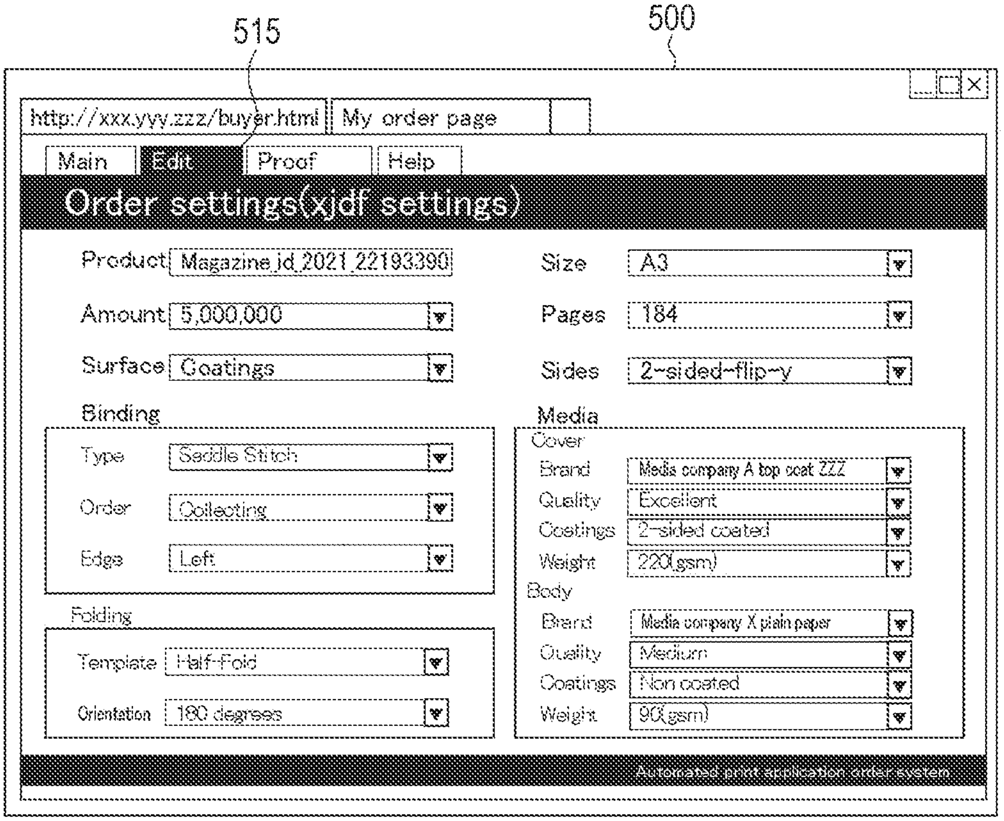
FIG. 5B is a screen example (part one) in the customer system.

FIG. 5B shows details of the JDF editing means 515. The means shown in FIG. 5B is provided for editing setting information having the JDF format including a specification of products transmitted by selecting the order request command issuing means 508, and for editing the setting information in accordance with the JDF format.

Figure 5C:
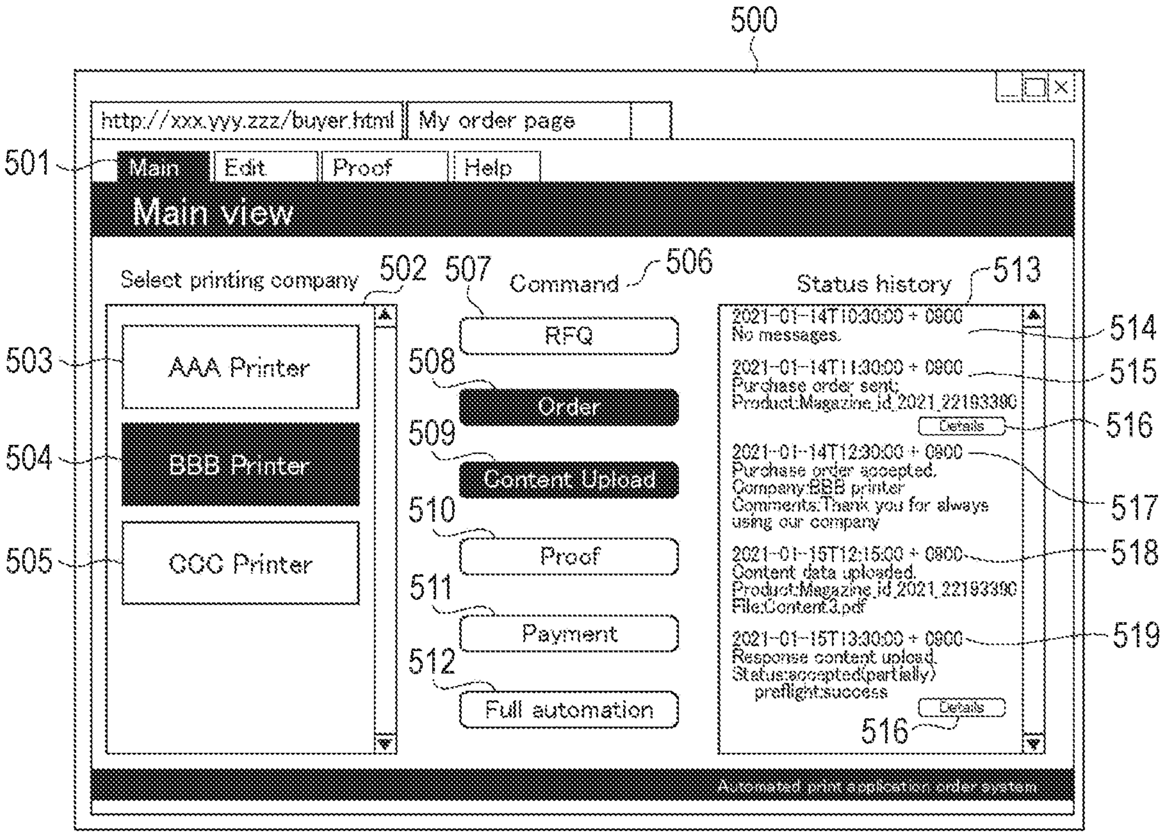
FIG. 5C is a screen example (part two) in the customer system.

FIG. 5C shows an example of a series of transmission/reception histories in a case where an instruction command provided in the command selection section 506 is executed from the customer system 101 to the second printing agent 504 in the state shown in FIG. 5A, and a response to the instruction command is received from the second printing agent 504. Referring to a history of executed commands presented by the status confirmation section 513, the contents of the executed commands of the present embodiment exchanged between the customer system 101 and the printing agent system 104 when ordering a product are described in detail.

FIG. 5C shows that, in a second status (515), an order command was transmitted to the second printing agent 504 via the order request command issuing means 508 at 11:30 on Jan. 14, 2021. As described above, the order command is instructed via the order request command issuing means 508. As shown in FIG. 5A, JDF data edited and created in the screen shown in FIG. 5B is also transmitted at the same time.

In a third status (517), at 12:30 on Jan. 14, 2021, it is shown that the order command was accepted as a response to the order command transmitted from the customer system 101 to the second printing agent 504 in the second status (515).

In a fourth status (518), it is shown that, in response to the order received by the second printing agent 504 in the third status (517), the customer system 101 executed a command of sending manuscript data to the second printing agent 504 at 12:15 on Jan. 15, 2021. The command of sending manuscript data is executed via the manuscript data transmitting means 509. As shown in FIG. 5C, a manuscript data file having the name "Content3.pdf" is transmitted.

In a fifth status (519), it is shown that a response to the fact that the command of sending manuscript data from the customer system 101 to the second printing agent 504 executed in the fifth status (518) was received at 13:30 on Jan. 14, 2021.

A detailed information displaying means 516 is selected to display more detailed information of the respective statuses as needed.

Figure 5D:
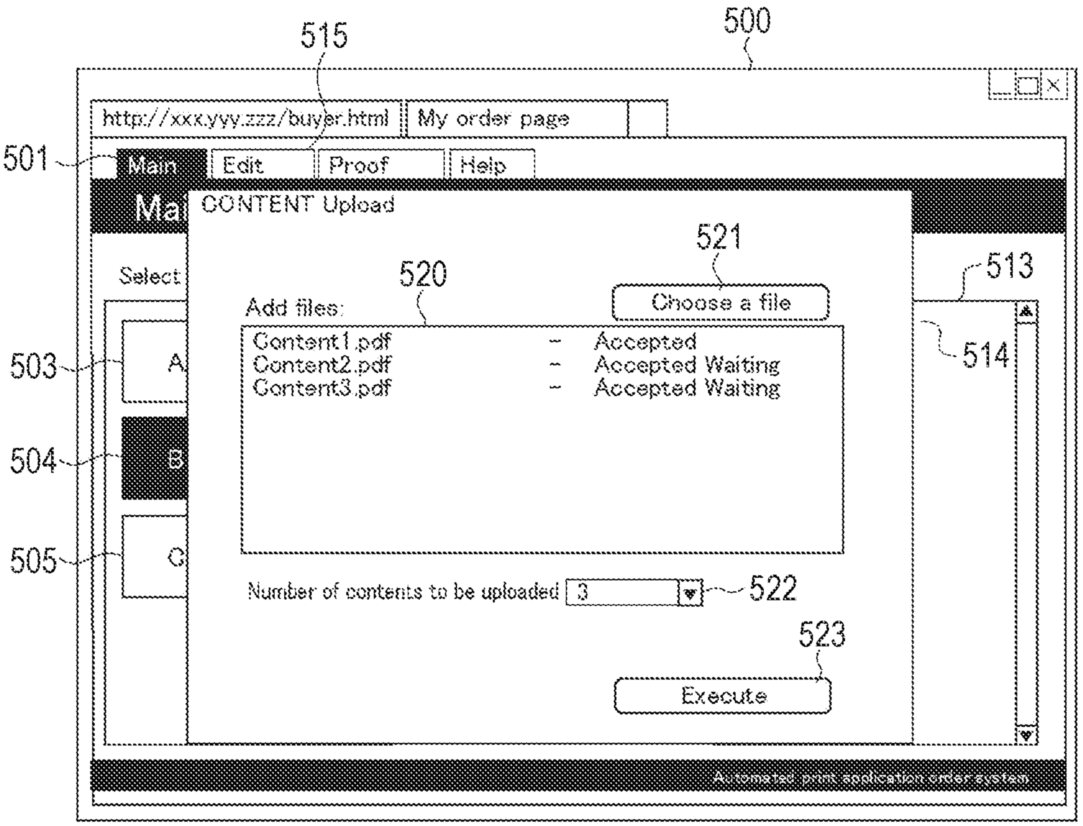
FIG. 5D is a screen example (part two) in the customer system.

FIG. 5D shows an example of a screen displayed after selecting the manuscript data transmitting means 509.

A manuscript data list 520 shows a list of manuscript data to be transmitted to the printing agent system. Manuscript data which are not transmitted to the printing agent system is displayed as "Accepted Waiting". On the other hand, "Accepted" is displayed for manuscript data that have already been accepted by the printing agent system, for example.

A manuscript data selection means 521 is used to select the manuscript data stored in the working environment of the customer. The manuscript data selected via the manuscript data selection means 521 are displayed in the manuscript data list 520.

A number of data specifying means 522 is used to specify the number of manuscript data to be transmitted by the customer. The numerical value specified via the specifying means 522 is reflected in, for example, the total number (Amount) of the manuscript data described in manuscript information section 909 of an input command 908 shown in FIG. 9C. Also, the number of manuscript data displayed as "Accepted" in the manuscript data list 520 is described in the manuscript information section 909 as the number of manuscript data that has already been transmitted (Actual Amount). In response to an input means (523) being pressed, the listed manuscript data shown in the list manuscript data list 520 are transmitted to the printing agent system.

When the number of the manuscript data listed in the manuscript data list 520 is greater than the number of the manuscript data specified by the number of data specifying means 522, a message is displayed to urge to delete the manuscript data, for example. Alternatively, a message is displayed to urge to increase the number of manuscript data via the specifying means 522. On the other hand, in a case where the number of manuscript data listed in the manuscript data list 520 is smaller than the number of manuscript data specified by the specifying means 522, a message is displayed to urge to upload the remaining manuscript data, for example. In the present embodiment, the number of manuscript data to be transmitted indicates the number of manuscript files to be transmitted.

FIGS. 6A to 6E show examples of operation screens displayed by the order information management program 405 shown in FIG. 4 that is executed by the information processing apparatus 108 of the printing agent system 104.

Figure 6A:
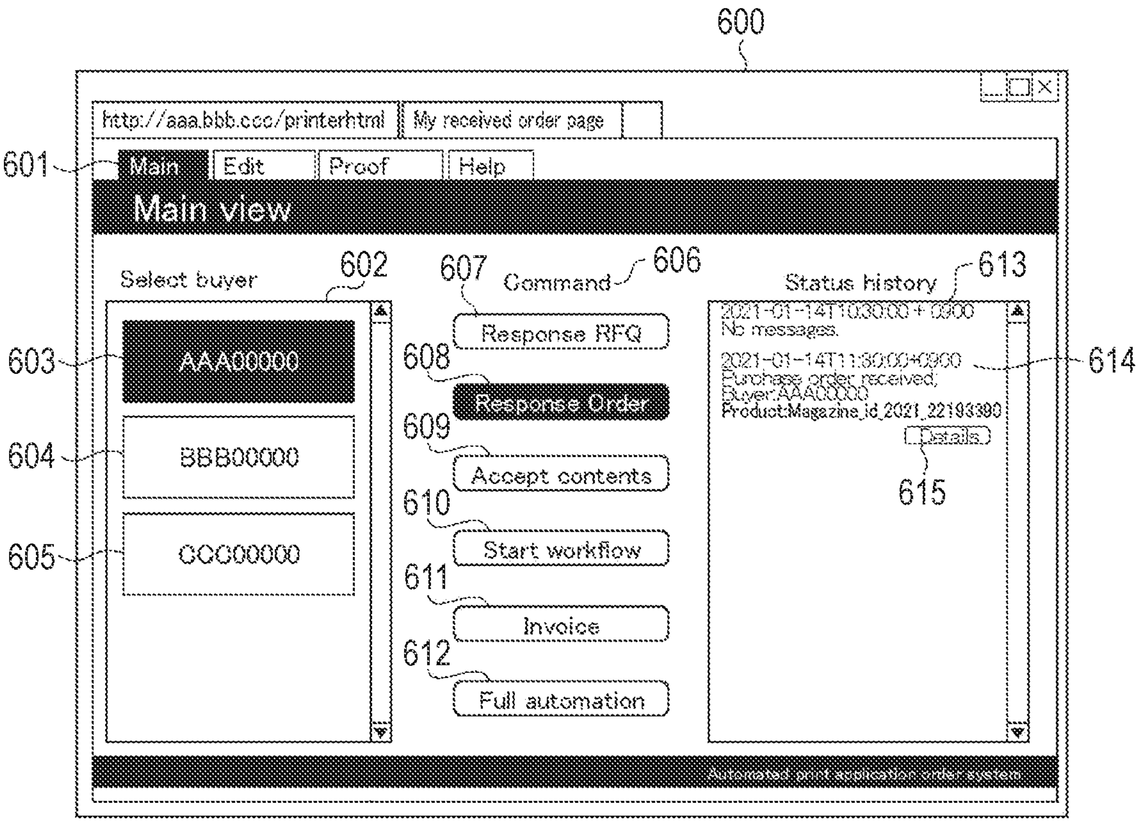
FIG. 6A is a screen example (part one) in the printing agent system.

FIG. 6A shows a main screen 600 of the order information management program 405 according to the present embodiment, and an order processing main tab 601 is selected. In the example shown in FIG. 6A, a customer selection section 602 is presented, and a first customer 603, a second customer 604, and a third customer 605 are displayed. The operation means of the order information management program 405 in the present embodiment is configured to allow the print agent to identify and manage orders separately from different customers by such a manner. The program allows to select any one of the multiple customers and take necessary processing depending on contents of command corresponding to the request. Further, the order information management program 405 according to the present embodiment is configured to allow to perform management including addition of customers from whom orders can be accepted and deletion of the customers via a customer management screen (not shown). In the example shown in FIG. 6A, the first customer 603 is selected to respond to a request from the first customer 603.

The command selection section 606 includes multiple command selection means for transmitting various kinds of processes to be executed as a printing agent and related to the order of printing products from the printing agent system 104 to the customer (101, 102, 103). The main use of the command selection section 606 is to provide means for selecting a response to various request commands for the printing agent instructed via the command selection section 506 of the customer system 101 shown in FIGS. 5A to 5E.

An estimate response command issuing means 607 instructs to transmit a response to a command from the customer system 101 for requesting an estimate of a cost required for making a product, that is, to present an estimated amount for making a specified object to the customer system 101. An order response command issuing means 608 is used to instruct to send to the customer system 101 a response to the order command from the customer system 101, i.e., a response to whether or not to accept an order. A manuscript data accepting means 609 instructs to send to the customer system 101 a response to a command of requesting to receive manuscript data sent from the customer system 101, i.e., a response to whether or not to accept the manuscript data.

A workflow execution instructing means 610 is used to instruct the workflow control program 411 to execute the production when the conditions necessary for the production of the printing products are set in the printing agent system 104.

A payment request execution means 611 instructs to charge a requester the cost of the production of the printing products requested by the customer system 101.

A status confirmation section 613 displays contents of the commands executed via the command selection section 506 and received from the customer system 101, or contents of the responses as a result of the commands executed by the printing agent system 104.

The example of the first status (614) of FIG. 6A shows that an order command via the order request command issuing means 508 was received in the second status (515) of FIG. 5C, i.e., 11:30 on Jan. 14, 2021.

Figure 6B:
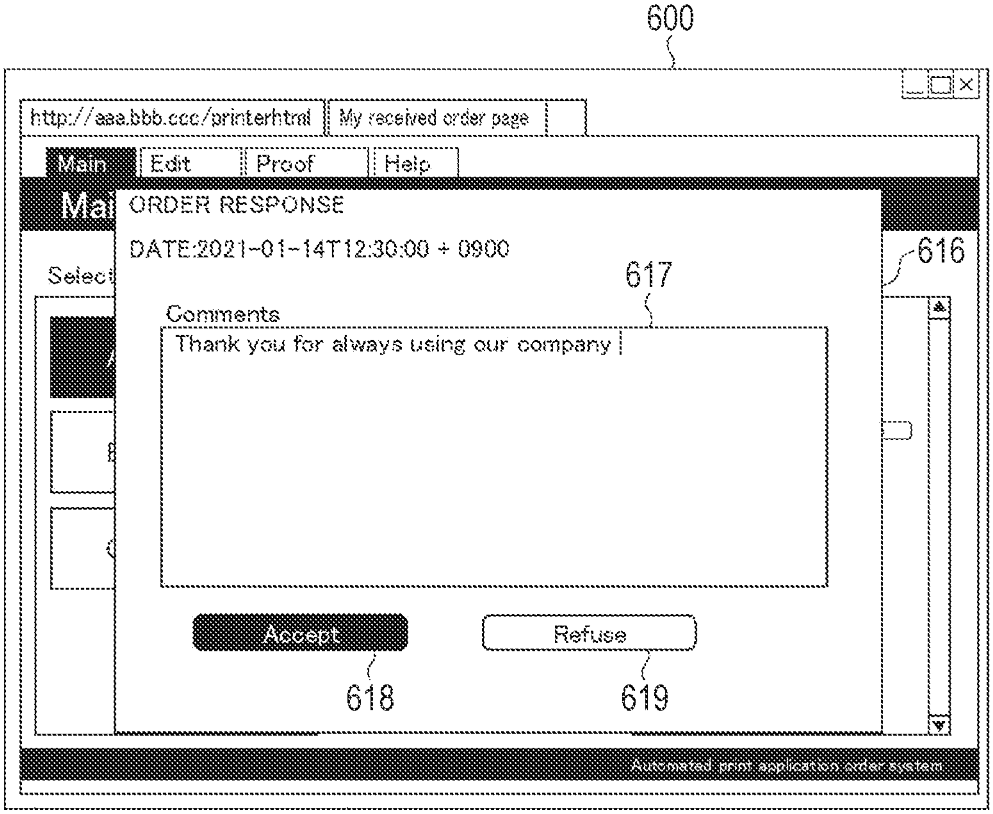
FIG. 6B is a screen example (part one) in the printing agent system.

FIG. 6B shows an example of an operation means 616 displayed when the order response command issuing means 608 is selected in FIG. 6A. When the order request command from the customer system 101 is accepted, an accepting means 618 can be selected, and when the order request command is not accepted, a refusing means 619 can be selected. FIG. 6B shows an example of providing an additional information input means 617 to give a reason for the response for the customer system 101 requesting the order when accepting or refusing the order. Information input in the additional information input means 617 is reflected in the third status (517) of FIG. 5C. The additional information input means of the present embodiment is an example of how additional information is input by an operator of the printing agent system 104 who decides to or not to make an input. However, similar information may be automatically generated, selected, presented, and stored by full automation means 612 based on conditions such as states of orders or contents of commands exchanged between the customer system 101 and the printing agent system 104.

Figure 6C:
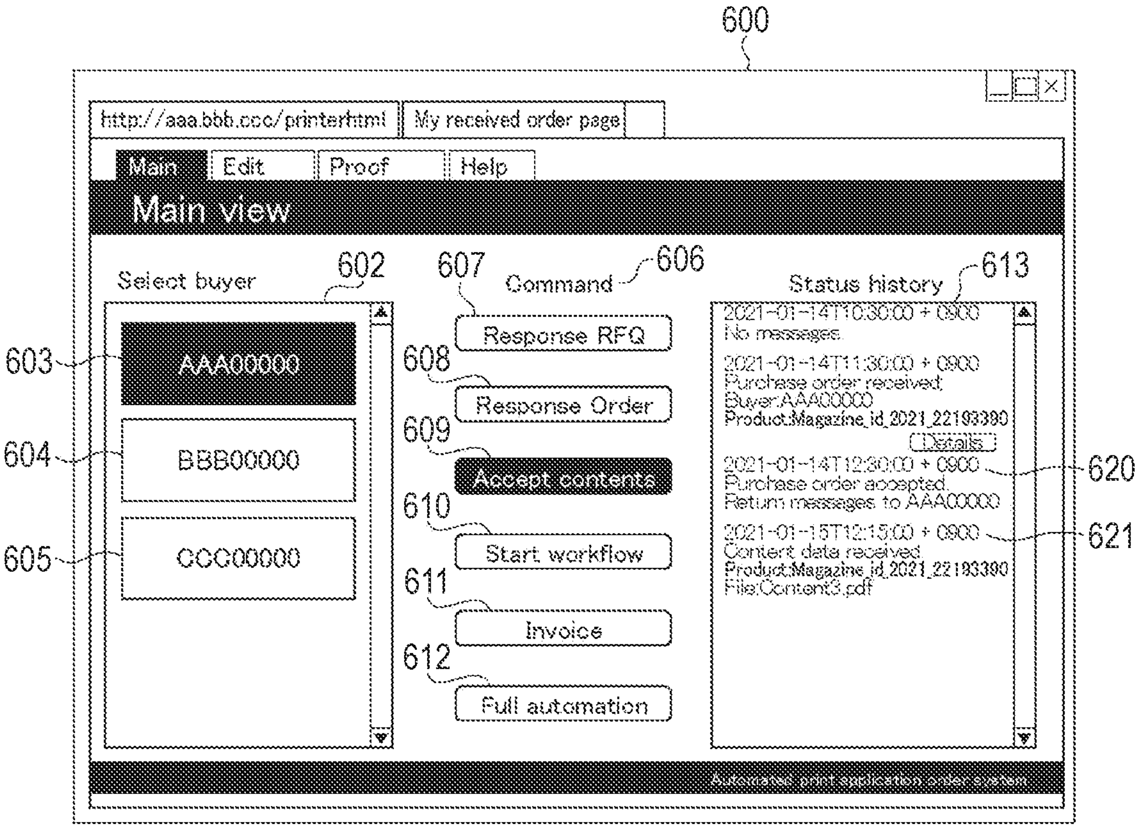
FIG. 6C is a screen example (part two) in the printing agent system.

FIG. 6C shows an example in which the operation is further advanced from the state shown in FIG. 6B. As a result of selecting the accepting means 618 of FIG. 6B, it is displayed in the second status (620) that a response was transmitted from the printing agent system 104 to the customer at 12:30 on Jan. 14, 2021.

Further, a status confirmation section 613 in FIG. 6C indicates that the printing agent 504 received content data in the third status (621) at 12:15 on Jan. 15, 2021 in response to a request of receiving the content data made in the fourth status (518) of FIG. 5C.

Figure 6D:
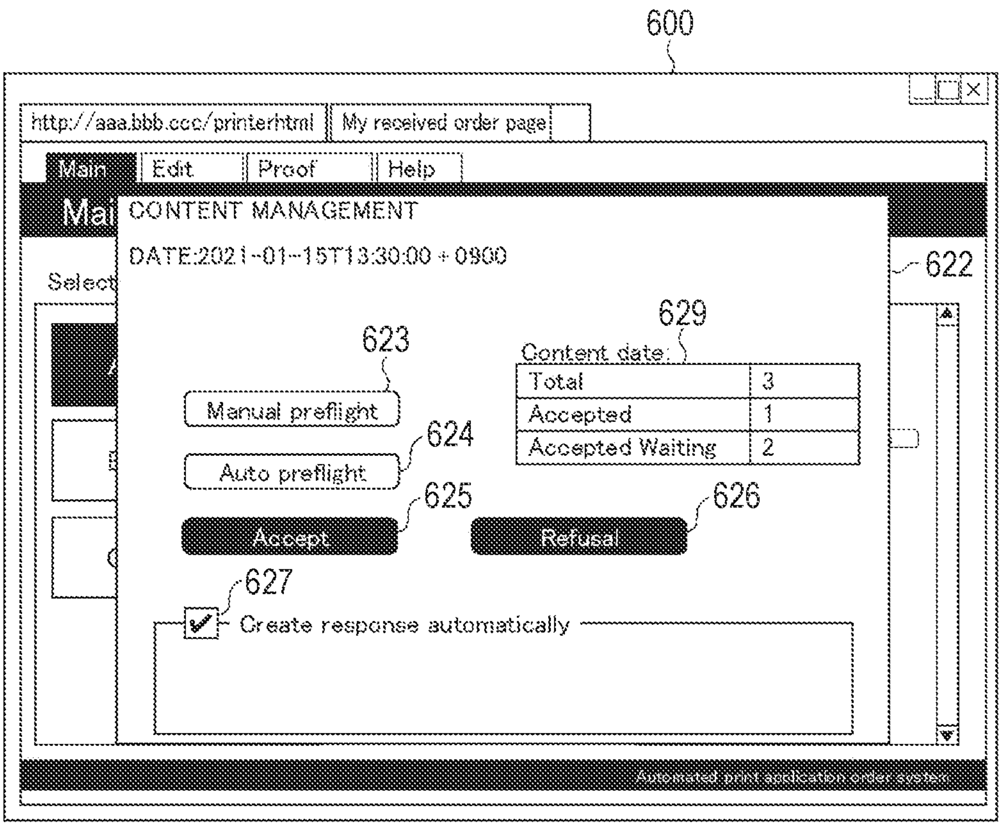
FIG. 6D is a screen example (part two) in the printing agent system.

FIG. 6D shows an example of a control means displayed when the manuscript data accepting means 609 is selected on the screen shown in FIG. 6C.

In the screen 622 of FIG. 6D, the manuscript data may be instructed to have a manual preflight (623), or to have an automatic preflight using predetermined settings (624). If the preflight is "successful", the printing agent makes a decision to accept manuscript data (625). If the preflight fails, the printing agent makes a decision to refuse manuscript data (626). When the manuscript data is accepted, the printing agent system 104 transmits a response to the customer, and the response is displayed on the customer system 101 as shown in the fifth status (519) of FIG. 5C, for example.

When multiple manuscript data are uploaded at the time of ordering, receiving only one manuscript data causes an omission of the manuscript data. To avoid the omission, the order information management program 405 displays a total number of manuscript data to be received, the number of manuscript data that have been currently accepted, and the number of manuscript data that have not been received on the screen (629) by using information of the number of manuscript data described in the electronic transaction data.

Specifically, the order information management program 405 determines the total number of manuscript data (Total) based on the number of manuscript data (Amount) shown in the manuscript information section 909 of FIG. 9C. The order information management program 405 determines the currently accepted number of manuscript data (Accepted) based on the number of currently received manuscript data (Actual Amount). The order information management program 405 determines the number of manuscript data that have not been accepted yet by subtracting the currently accepted number from the total number of manuscript data.

When a check box 627 is validated, the order information management program 405 automatically compares the number of manuscript data with the electronic transaction data at the time of order without a user selecting the manuscript data accepting means 609. The order information management program 405 checks the preflight of the manuscript data and the number of the manuscript data, and returns a status of the received manuscript data to the customer system 101 as a response.

Figure 6E:
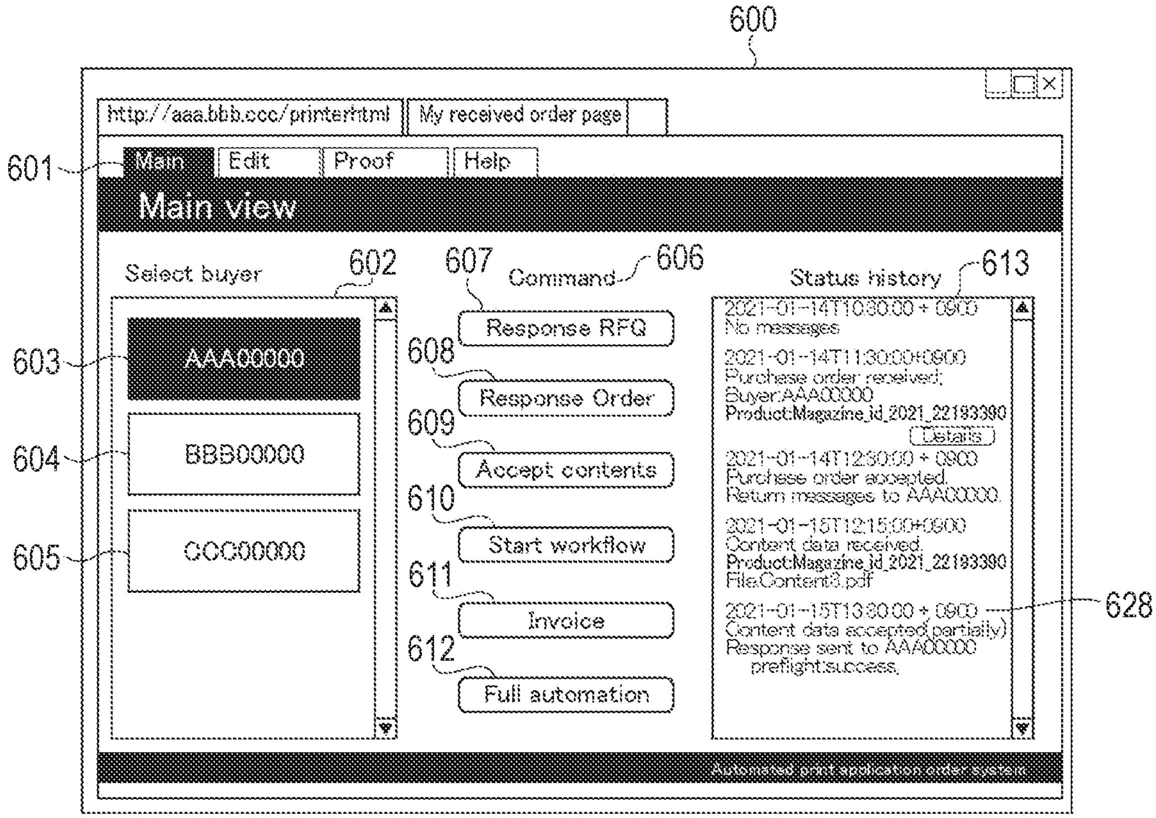
FIG. 6E is a screen example (part three) in the printing agent system.

FIG. 6E shows an example of a result of the operation via the operation means shown in FIG. 6D. It is shown that the content data transmitted by the customer system 101 in the fourth status (518) shown in FIG. 5C has been accepted in the fourth status (628).

More specifically, in a case where the number of the received manuscript data has not reached the number of manuscript data described in the electronic transaction data at the time of order, the printing agent system transmits a manuscript response section 906 included in a response 808 shown in FIG. 9B to the customer system. Based on a value of the "Result" included in the manuscript response section 906 of the response 808, "Content Data Accepted (Partially)" is displayed in the fifth status (519), for example.

Figure 5E:
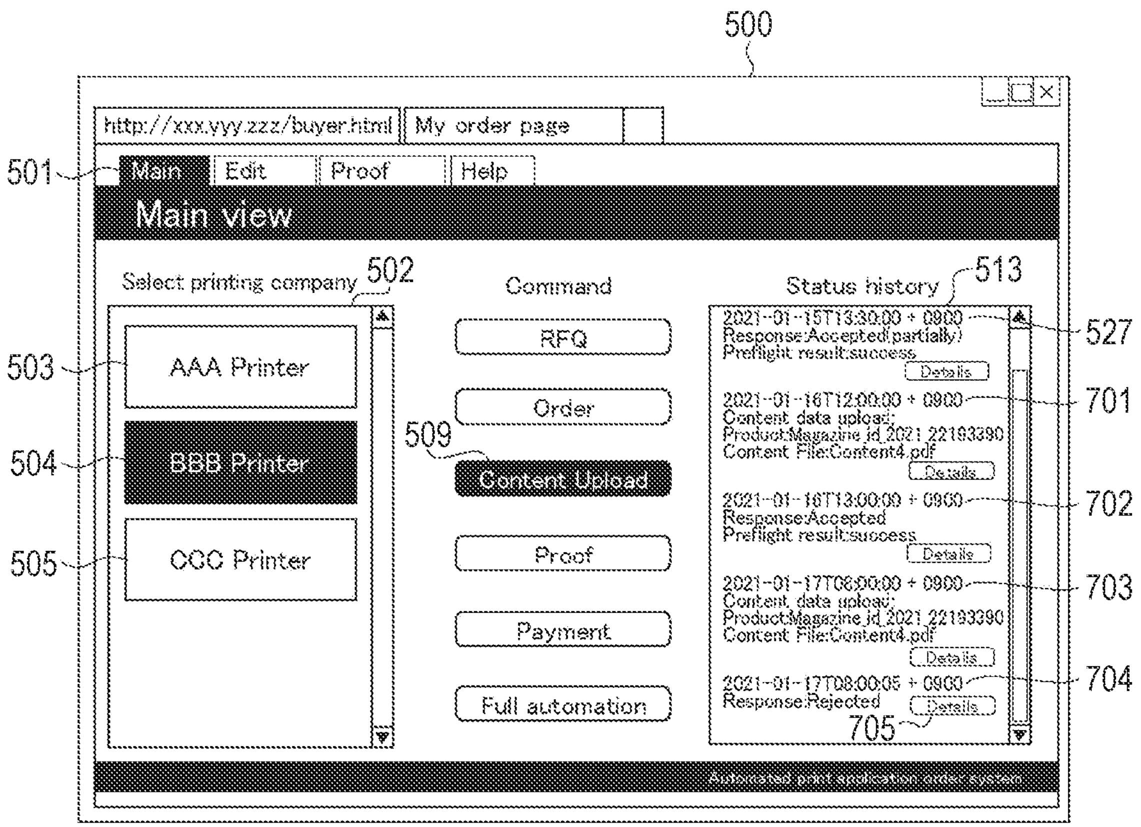
FIG. 5E is a screen example (part three) in the customer system.

FIG. 5E shows an example in which the customer system 101 transmits an additional document to the selected printing agent system 104 through the operation shown in FIG. 5C.

When all the transmitted manuscript data are accepted by the printing agent, it is displayed in the status confirmation section 513 for the customer that all the manuscript data have been accepted.

When the customer uploads two manuscript data, "Accepted (Partially)" is displayed as shown in a status 527 after the first manuscript data is accepted by the printing agent, for example. When the second manuscript data is accepted by the printing agent, "Accepted" is displayed as shown in a status 702, as all of the manuscript data have been received. Thus, the customer can confirm that all pieces of manuscript data described in the electronic transaction data when ordering has been transmitted without any omission. When the preflight processing for the manuscript data fails, it is necessary to recreate the manuscript data so that the manuscript data is rejected. As a result, "Rejected" is displayed as shown in a status 705.

Figure 8:
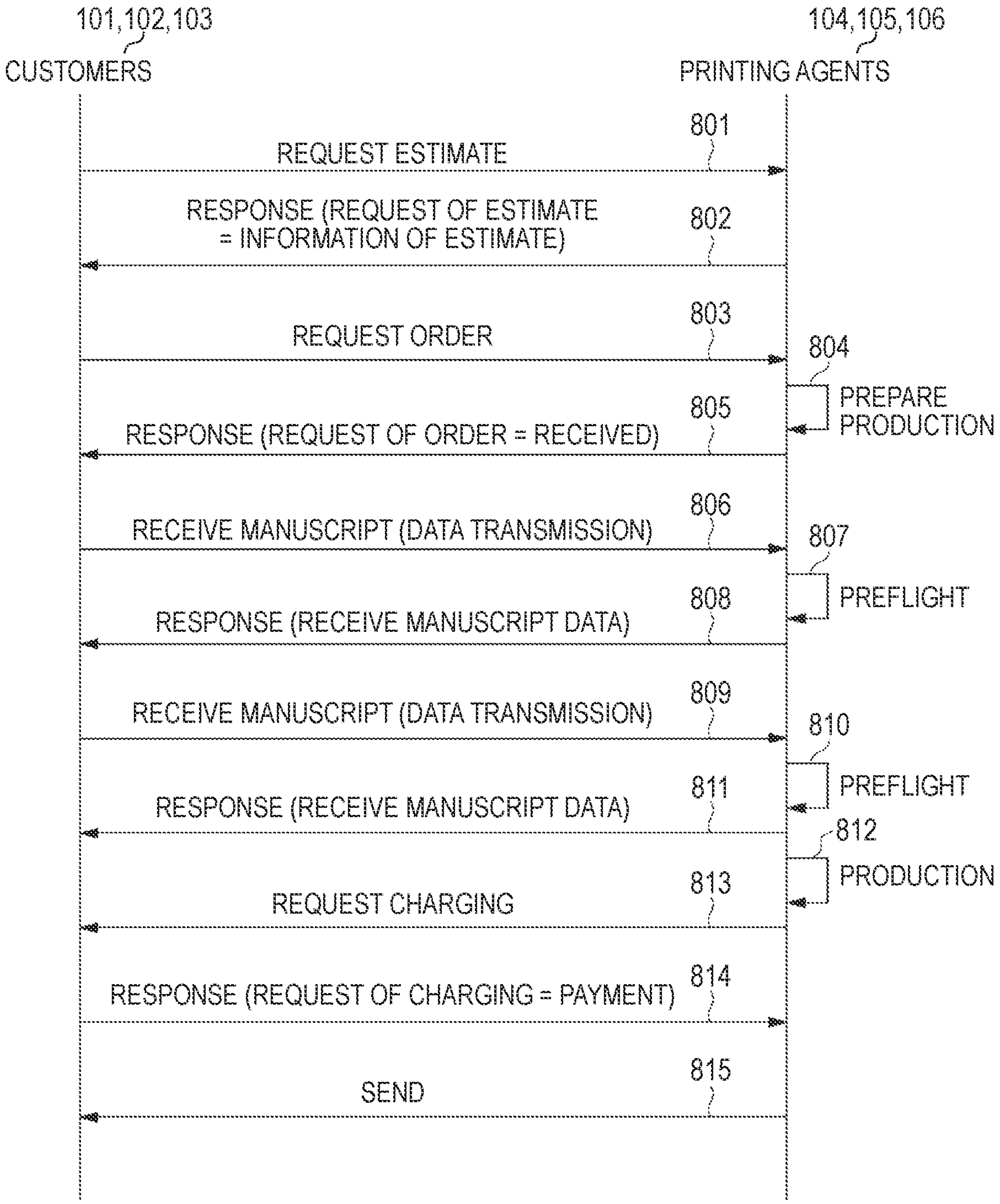
FIG. 8 shows an example of a sequence of commands and responses transmitted and received between the customer system and the printing agent system.

FIG. 8 shows a sequence of commands and responses exchanged between the customer system 101 and the printing agent system 104.

An estimate requesting command 801 is transmitted from the customer system 101 to the printing agent system 104. As shown in FIG. 5A, an instruction for transmitting the command is made via the estimate request command issuing means 507.

The printing agent system 104 transmits estimate information 802 to the customer system 101 as a response 802 to the estimate requesting command 801. The transmission of the response 802 is instructed via the estimate response command issuing means 607 shown in FIG. 6A.

Based on the estimate information included in the response 802, the customer system 101 transmits an order request command 803 to the printing agent system 104. The order request command 803 is instructed via the order request command issuing means 508 shown in FIG. 5A.

In response to receiving the order request command 803, the printing agent system 104 accepts content of the order and prepares for production (804). Specifically, the printing agent system 104 sets up a workflow described later.

When the order request command 803 from the customer system 101 is accepted, a response 805 is transmitted to the customer system 101. The transmission of the response 805 is instructed via the order response command issuing means 608 shown in FIG. 6A.

Then, the customer system 101 transmits a manuscript transmission command 806 to the printing agent system 104 to execute a manuscript transmission process when manuscript data to be printed is ready. The manuscript transmission command 806 is transmitted via the manuscript data transmitting means 509 shown in FIG. 5A.

In response to receiving the manuscript data, the printing agent system 104 executes a preflight process 807 on the received data, and transmits a response 808 to the customer system 101 after completing the process. The transmission of the response 808 is instructed via the manuscript data accepting means 609.

As shown in FIG. 5A, the order request command 803 is executed as a command separate from the manuscript transmission command 806 to adapt the system of the present embodiment to the conventional manners of the print production industry when ordering of printing product.

The customer system 101 transmits an additional manuscript transmission command 809 to the printing agent system 104 as necessary. The additional manuscript transmission command 809 may be needed when the system of the present embodiment receives a request such as transmission of additional documents, transmission of documents to replace the currently received document, etc., as shown in FIG. 5E.

When the printing agent system 104 receives the additional manuscript transmission command 809, the preflight process 810 is executed similarly to the execution of the preflight process 807, and after this process, a response 811 is transmitted from the printing agent system 104 to the customer system 101.

Specifically, the order information management program 405 confirms the number (Amount) of the manuscript data indicated in the manuscript information section 909 of FIG. 9C to determine the total number (Total) of the manuscript data expected to be transmitted from the customer. Further, the order information management program 405 determines the currently accepted number (Accepted) of data based on the number (Actual Amount) of manuscript data received.

When the currently accepted number of data reaches the total number of manuscript data, the order information management program 405 transmits to the customer system a response 811 of FIG. 8 including a message indicating that all manuscript data have been accepted. For example, the message indicating that all manuscript data have been accepted includes a description "Accepted" in the Result of the manuscript information description section.

On the other hand, when the currently accepted number of data does not reach the total number of manuscript data, the order information management program 405 transmits to the customer system a response 811 of FIG. 8 including a message indicating waiting for manuscript data. For example, the response 811 includes a value of the Result shown in the manuscript information section 906 of FIG. 9B.

Then, the printing agent system 104 executes a production 812 of the printing products based on the preparation of the production (804) started in response to receiving the order request command 803, the order request command 803, and the manuscript transmission command 806, 809. In the example according to the present embodiment, the execution of the production is instructed via the workflow execution instructing means 610 shown in FIG. 6A.

At a timing when the production 812 of the requested printing products is finished, a billing command 813 to charge for a cost of the production is transmitted from the printing agent system 104 to the customer system 101. The transmission of the command is instructed via the payment request execution means 611 shown in FIG. 6A.

Upon receiving the billing command 813, the customer system 101 transmits a response 814 for payment to the printing agent system 104 in order to execute a payment process in response to the bill. In the system according to the present embodiment, electronic payment processing is executed in the course of transmitting the response.

After the payment process is completed or prior to the payment process, the manufactured printing products are sent (815) from the printing agent system 104 to the customer system 101. In the system according to the present embodiment, the sending process is executed by a sending means (not shown).

FIGS. 9A to 9J show examples of actual data of commands and responses transmitted and received between the customer system 101 and the printing agent system 104. FIG. 9A shows an example of data of the order request command 803 and the corresponding response 805. FIG. 9B shows an example of data of manuscript transmission command 806 and the corresponding response 808. FIG. 9C shows an example of data of the manuscript transmission command 809 and the corresponding response 811. FIG. 9D shows an example of data of the manuscript transmission command 809 in manuscript information section 910 and the corresponding response 811 in manuscript information section 911. FIG. 9E shows an example of the manuscript transmission command 806 and the corresponding response 808 data in manuscript response station 914. FIG. 9F shows an example of data of the manuscript transmission command 809 and the corresponding response 811 in manuscript response station 916. FIG. 9G shows a list 917 of manuscript data. FIG. 9H shows an example of the manuscript transmission command 806 and the corresponding response 808 data. FIG. 9I shows an example of data of the manuscript transmission command 809 and the corresponding response 811.

FIG. 9A shows an example of data of the order request command 803 and the corresponding response 805. An order information section 901 includes a command character string indicating that the command is an order requesting command, a Business ID for identifying a series of electronic data being dealt, and information for identifying a customer and a printing company involved in the order.

An order content section 902 includes information such as a name of ordered products, contents of production including a specification of products or the number of copies to be produced, a medium to be used, and the like. The order content section 902 corresponds to the information created by the setting means shown in FIG. 5B.

The response 805 includes reply data responding to the order request sent from the customer system 101 to the printing agent system 104 based on the order information section 901 and the order content section 902.

An order response section 903 includes a command character string indicating the response 805 being a response to the order request command, a Business ID for identifying a series of electronic data being dealt, and information for identifying the customer and the printing company involved in the order. The order response section 903 also includes an Order Status indicating that the order has been accepted and comment information having an arbitrary format returned from the printing agent system 104 to the customer system 101.

FIG. 9B shows an example of data of the manuscript transmission command 806 and the corresponding response 808. A manuscript information section 904 includes a command string indicating that the data is a manuscript transmission command, a Business ID for identifying a series of electronic data being dealt, and information for identifying the customer and the printing company involved in the order. The example of FIG. 9B shows a case of the Update Method indicating that this manuscript transmission processing is to add documents. Further, the total number (Amount) of manuscript data and the number (Actual Amount) of manuscript data that have already been accepted are explicitly indicated so that the expected number of manuscript data can be shared between the customer and the printing agent.

A manuscript data specifying section 905 specifies a file of electronic data to be transmitted. That is, FIG. 9B shows an example in which a file "Content3.pdf" is to be transmitted as additional data.

The response 808 includes reply data configured based on the manuscript information section 904 and the manuscript data specifying section 905 for responding to the manuscript transmission process regarding the order requested by the customer system 101 to the printing agent system 104.

The manuscript response section 906 includes a command character string indicating that the data is a response to the manuscript transmission command, a Business ID for identifying a series of electronic data being dealt, and information for identifying the customer and the printing company involved in the manuscript transmission. The example of FIG. 9B shows the Result indicating that the transmitted manuscript data is accepted and it is also possible to send additional manuscript.

A preflight result section 907 includes a result of the preflight executed by the printing agent system. The result includes, for example, a file name of the manuscript data for which the preflight was executed, and a result of the preflight.

FIG. 9H shows an example of the manuscript transmission command 806 shown in FIG. 8 received according to the present embodiment. A manuscript information section 919 has a feature of not including a description about information relating to the number of manuscript data. Also, a manuscript data specifying section 920 specifies two manuscript data. The response 808 shown in FIG. 9H corresponds to a response to the manuscript transmission command 806, and the response 808 includes a description "Accepted Waiting" in the Result of a manuscript response section 921, which indicates that all of the manuscript data have not been received.

Figure 7:
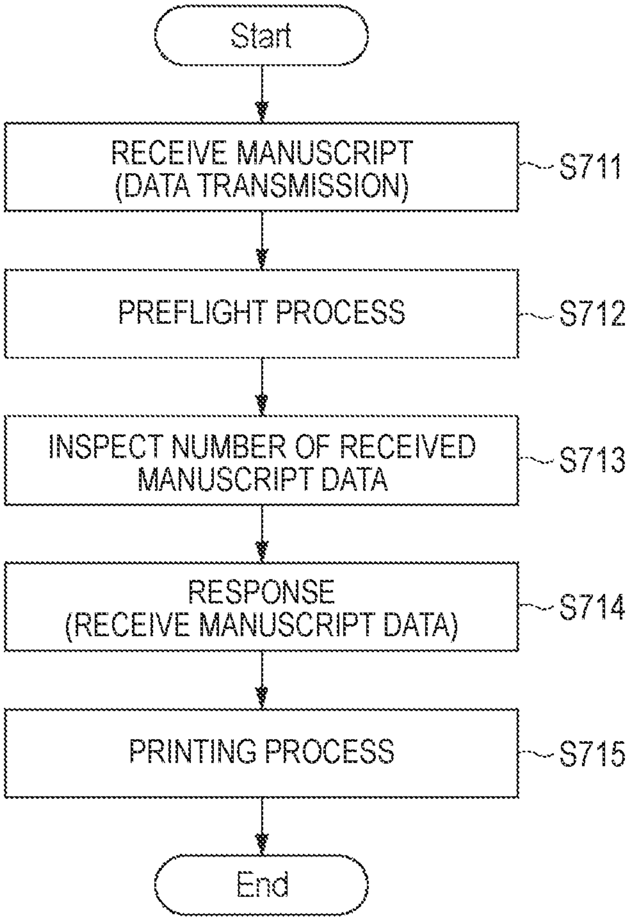
FIG. 7 is a flowchart of processing performed in the printing agent system.

FIG. 7 is a flowchart showing the overall flow of processing according to the present embodiment.

In step S711, the customer system 101 makes manuscript data to be printed, and transmits a manuscript transmission command to the printing agent system 104 after the preparation of the data is completed to execute the manuscript transmission process. Step S711 corresponds to the processing shown with the command 806 of FIG. 8.

In step S712, the printing agent system 104 that has received the manuscript data executes a preflight process 807 on the received data. Step S712 corresponds to the process 807 shown in FIG. 8.

In step S713, after completing the preflight process, the process of verifying the number of manuscript data according to the present invention is executed. This processing is executed every time the manuscript data is received.

In step S714, the printing agent system 104 transmits a response 808 to the customer system 101 after completing the processing for the received manuscript data. Step S714 corresponds to the processing shown with the response 808 of FIG. 8.

In step S715, the printing agent system 104 performs a printing process (production of printing products) using the manuscript data. Step S714 corresponds to the processing shown with the production 812 of FIG. 8.

Figure 14:
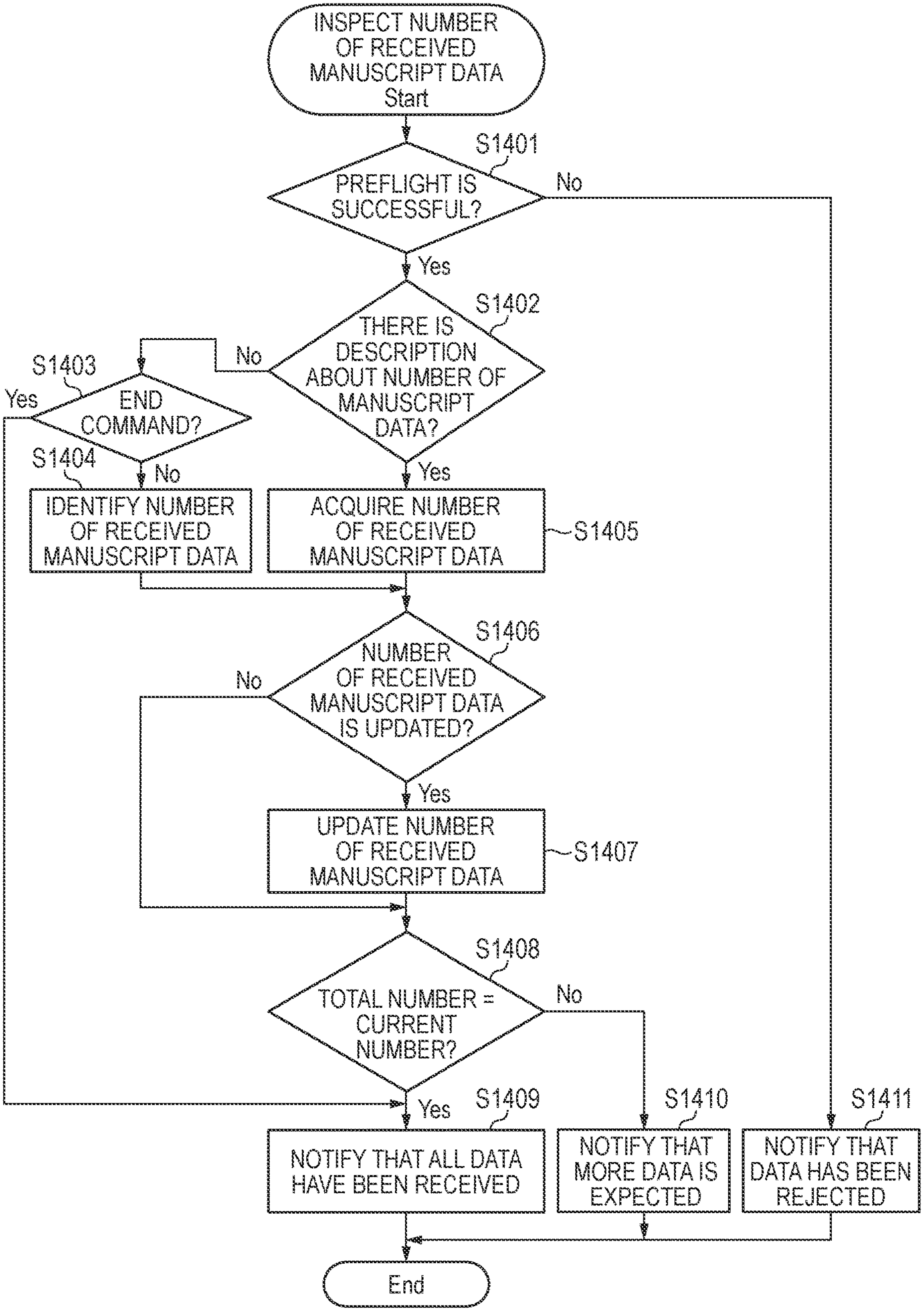
FIG. 14 is a flowchart relating to verification of the number of manuscript data.

FIG. 14 is a flowchart of a process for verifying the number of manuscript data according to the present embodiment.

In step S1401, the manuscript data verifying unit 1104 determines whether or not the preflight processing is successful. The processing proceeds to step S1402 if the preflight processing is successful, and the processing proceeds to step S1411 if the preflight processing fails.

In step S1402, the manuscript data verifying unit 1104 determines whether or not the received manuscript transmission command includes a description about the number of the manuscript data. The manuscript data verifying unit 1104 advances the processing to step S1405 if the command includes a description about the number of manuscript data, and the manuscript data verifying unit 1104 advances the processing to step S1403 if the command does not include the description.

For example, the manuscript transmission command 806 shown in FIG. 9B includes a description about the total number (Amount) of manuscript data in manuscript information section 904, and specifies "two" as the number. The manuscript transmission command 806 shown in FIG. 9E does not include a description about the total number (Amount) and the currently accepted number (Actual Amount) of manuscript data in manuscript information section 912. The manuscript transmission command 806 shown in FIG. 9H does not include information about the number of manuscript data in the manuscript information section 919, and the manuscript transmission command 809 shown in FIG. 9I does not include information about the number of manuscript data in the manuscript information section 922.

In step S1403, the manuscript data verifying unit 1104 determines whether uploading of the data is completed. Here, it is determined that upload is not completed if the manuscript data is specified via the manuscript transmission command, and it is determined that upload is completed if the manuscript data is not specified via the manuscript transmission command. Specifically, when the manuscript transmission command 806 shown in FIG. 9H is received, it is determined that the command does not indicate the completion of uploading the manuscript data because the command includes the manuscript data specifying section 920. When the manuscript transmission command 809 shown in FIG. 9I is received, it is determined that the upload of the manuscript data is completed because the command does not include the manuscript data section 923, and the manuscript data is not specified. In case of YES in step S1403, the process proceeds to step S1409. In step S1105, a response indicating that all of the manuscript data have been received is transmitted. For example, the response 811 as shown in FIG. 9I in which a description "Accepted" is included in the Result of the manuscript response section 924 is created.

In step S1404, the manuscript data verifying unit 1104 specifies the number of manuscript data. An example of specifying the total number of manuscript data is described below.

For example, in case of the manuscript transmission command 806 shown in FIG. 9E, two files of electronic data to be transmitted are specified in the manuscript data specifying section 913. That is, since two FileSpec elements are described, the manuscript data verifying unit 1104 determines that the total number of manuscript data is two. Next, an example of a process for identifying the current number of accepted data is described. Among the FileSpec elements included in the manuscript data specifying section 913, one element specifies a file "Content3.pdf" in a URL attribute, and the other element does not have a value in the URL attribute. Thus, the manuscript data verifying unit 1104 determines that the number of currently accepted data is one.

When the printing agent system receives the manuscript transmission command 809 shown in FIG. 9F through the command 809 of FIG. 8, the manuscript data verifying unit 1104 determines whether or not the received manuscript transmission command 809 includes a description about the number of manuscript data in step S1402. Since the manuscript transmission command 809 does not include a description about the number of manuscript data, the manuscript data verifying unit 1104 advances the processing to step S1404.

In step S1404, the manuscript data verifying unit 1104 specifies the number of manuscript data. Two files of electronic data to be transmitted are specified in the manuscript data specifying section 915. That is, since two FileSpec elements are described, the manuscript data verifying unit 1104 determines that the total number of manuscript data is two. Further, since files of "Content3.pdf" and "Content4.pdf" are specified in the URL attribute of the FileSpec element of the manuscript data specifying section 915, the manuscript data verifying unit 1104 determines that the number of currently accepted data is two.

In step S1405, the manuscript data verifying unit 1104 acquires the number of manuscript data from the manuscript transmission command 806. As described above, the manuscript transmission command 806 shown in FIG. 9B specifies the total number (Amount) of the manuscript data and the number of currently accepted data (Actual Amount) in the manuscript information section 904. Thus, the manuscript data verifying unit 1104 acquires both the total number of manuscript data and the number of currently accepted data, and holds these numbers. Then, the manuscript data verifying unit 1104 updates the number of currently accepted data every time manuscript data is received.

FIG. 12A shows a table 1200 as an example of holding the numbers of manuscript data. The table 1200 shown in FIG. 12A holds a Business ID, a time stamp, the total number of manuscript data, and the number of currently received manuscript data described in the manuscript transmission command 806. The holding may be implemented using a database, or may be implemented using an on-memory unless the data is to be held for a long period of time.

In step S1406, the manuscript data verifying unit 1104 determines whether or not the total number of manuscript data acquired in step S1405 has been updated. The manuscript data verifying unit 1104 determines the update using the two manuscript transmission commands received from the customer system. The manuscript data verifying unit 1104 advances the processing to step S1407 if the total number is updated, and the manuscript data verifying unit 1104 advances the processing to step S1408 if the total number is not updated. More specifically, for example, if the manuscript transmission command 809 shown in FIG. 9C received before indicates two as the total number of manuscript data and the manuscript transmission command 809 shown in FIG. 9D received this time indicates five as the total number of manuscript data, it is determined that the total number of manuscript data has been updated.

In step S1407, the manuscript data verifying unit 1104 updates the number of the held manuscript data. At the time of receiving the first manuscript transmission command 806 shown in FIG. 9B is received, a difference between the total number of manuscript data and the number of currently accepted data is one as shown in a table 1202 of FIG. 12B. On the other hand, since the total number of manuscript data is changed from two to five in the manuscript transmission command 809 of FIG. 9D, the number of manuscript data held at the time of receiving the second manuscript transmission command 809 is changed as shown in a table 1203 of FIG. 12B.

In step S1408, the manuscript data verifying unit 1104 compares the total number of manuscript data (Amount) and the number of currently accepted data (Actual Amount). In step S1104, the manuscript data verifying unit 1104 determines whether or not the total number of manuscript data is equal to the number of currently accepted data based on the comparison made in step S1408. The process proceeds to step S1409 if the total number of manuscript data is equal to the number of currently accepted data, and the process proceeds to step S1410 if the total number of manuscript data is not equal to the number of currently accepted data.

In the example of FIG. 12A, the manuscript data verifying unit 1104 holds the number of manuscript data shown in the table 1200 at the time of receiving the manuscript transmission command 806, so that the manuscript data verifying unit 1104 advances the processing to step S1410. On the other hand, the manuscript data verifying unit 1104 holds the number of manuscript data shown in the table 1201 at the time of receiving the manuscript transmission command 809. The manuscript data verifying unit 1104 advances the processing to step S1409, as the total number of manuscript data is equal to the number of currently accepted data in the table 1201.

In step S1409, the manuscript data verifying unit 1104 creates a response for notifying that all the manuscript data have been received. For example, the Result of the manuscript response section 909 of the response 811 shown in FIG. 9C indicates that all of the manuscript data have been accepted and that no additional manuscript data can be accepted.

In step S1410, the manuscript data verifying unit 1104 creates a response indicating that there is manuscript data that has not yet been received from among the data to be received (data waiting notification). For example, the Result of the manuscript response section 906 of the response 808 shown in FIG. 9B indicates that it is possible to transmit additional manuscript.

In step S1411, the manuscript data verifying unit 1104 creates a response indicating that the manuscript data has been rejected. For example, the Result of the response section of the response 808 shown in FIG. 9J indicates that additional documents can be transmitted. Further, the Result of the preflight result section 920 indicates that the preflight of the manuscript data failed.

As described above, describing the number of manuscript data in a manuscript transmission command of electronic transaction data allows the printing agent system to know the number of manuscript data to be transmitted from the customer system. Although an example is shown in which the number of manuscript data is described in a manuscript transmission command and sent to the printing agent system, the number of manuscript data may be included in an order request command or another command instead of the manuscript transmission command. Otherwise, information on the number of manuscript data may be transmitted to the printing agent system as information different from the commands.

Furthermore, it is possible to determine whether the number of manuscript data has been updated and update the number of manuscript data when the number of manuscript data is changed after an order, for example.

In addition, even if the number of manuscript data is not described in a manuscript transmission command of the electronic transaction data (order data), it is possible to determine the number of manuscript data by checking parameters for specifying files of the manuscript data or by checking the number of manuscript transmission commands.

Even though the customer system does not specify the number of manuscript data, sending a completion command allows the printing agent system to determine that all manuscript data have been received.

The embodiment described above can prevent an omission when sending the manuscript data, and can prevent problems such as, for example, a printing agent initiating production even though all the manuscript data have not been received. Further, the present embodiment allows a printing agent to notify a customer of the status of the manuscript data as to whether or not all the manuscript data have been received, and allows the customer to confirm status of the transmitted manuscript data. The present embodiment is particularly effective for a system where manuscript data may not be sent at the same timing as giving a printing order and the manuscript data may be sent after giving the order.

First Modified Example

In the example of the first embodiment described above, the status of the manuscript data is determined by using electronic transaction data at the time of the order that describes the number of manuscript data. According to the first modified example, the total number of manuscript data is determined based on print settings described in the electronic transaction data. For example, in case of making business cards with double-sided printing, it may be defined that two data files are needed. That is, one file is required for the front surface of the business card and the other file is required for the back surface of the business card.

Figure 10A:
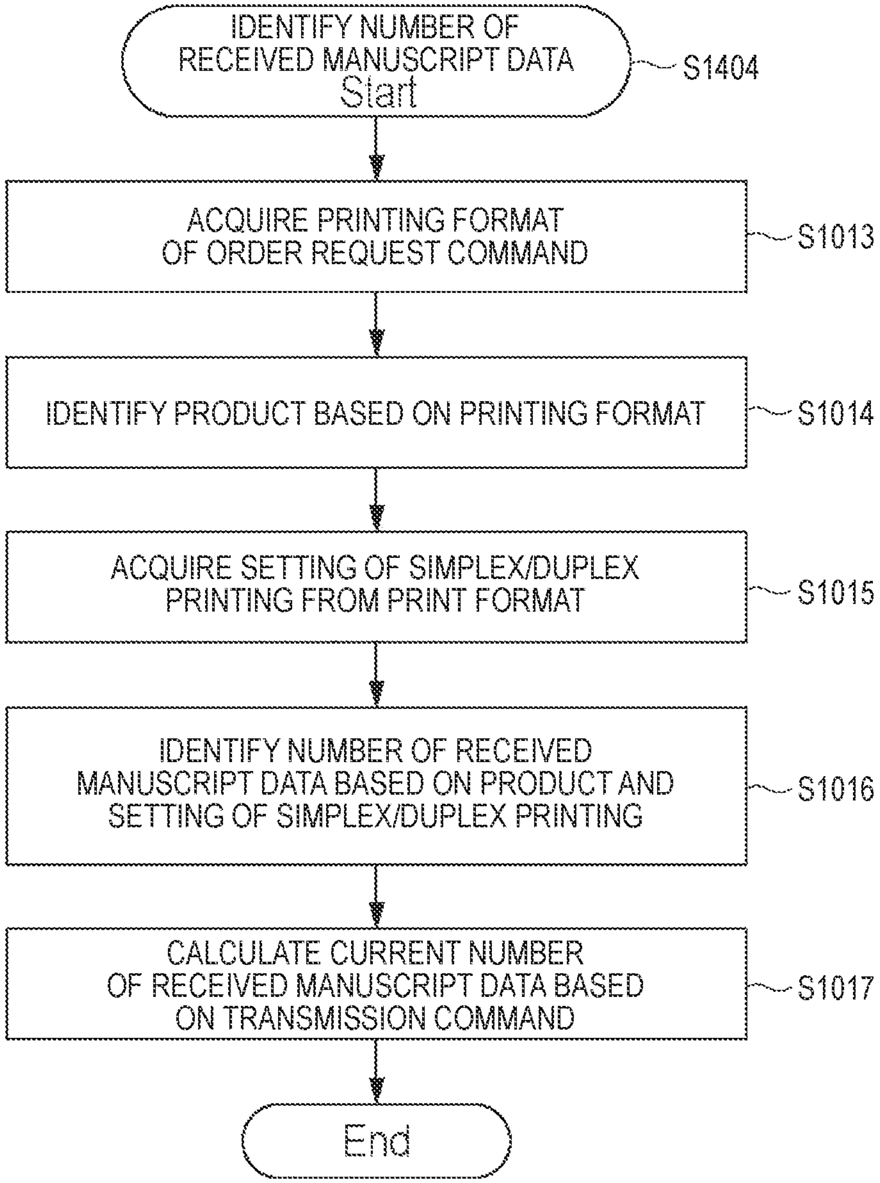
FIG. 10A shows a detailed flowchart of a modified example of step S1405.

FIG. 10A is a flowchart specifically showing the processing according to the first modified example with respect to step S1404 shown in FIG. 14.

In step S1013, the manuscript data verifying unit 1104 acquires the order content section 902 from the received order request command 803 shown in FIG. 8. In case of the order request command 803 shown in FIG. 9A, the order content section 902 includes print settings such as a name of the product (Descriptive Name), a size of the product (Dimension), and double-sided printing (Sides).

In step S1014, the manuscript data verifying unit 1104 confirms the name of the product (Descriptive Name) based on the order content section 902 acquired in step S1013, and identifies the product. The order content section 902 specifies a business card.

In step S1015, the manuscript data verifying unit 1104 identifies the print setting with respect to the single-side printing or double-side printing based on the order content section 902. The order content section 902 specifies the double-sided printing.

In step S1016, the manuscript data verifying unit 1104 specifies the total number of manuscript data based on the product specified in step S1014 and the setting of double-sided printing or single-sided printing specified in step S1015. This example uses the table shown in FIG. 15A. In the table of FIG. 15A, the product names and double-sided or single-sided print settings are associated with the number of manuscript data. Since the order content section 902 indicates that the product is a business card and the setting of double-side printing is specified, the number of manuscript data is two.

In step S1017, the manuscript data verifying unit 1104 calculates the number of currently accepted data based on the manuscript data specifying section 913.

The table of FIG. 15A shows an example. For example, the table may not specify the setting of single-sided printing or double-sided printing, and may just associate product names with the numbers of manuscript data. In case of a product such as a booklet, the table may include a setting about a jacket and a setting about a narrow paper band placed around the jacket as shown in FIG. 15B. In case of using the table shown in FIG. 15B, the order content section 902 is configured to include information indicating that the product is a booklet, the booklet has a jacket or no jacket, the booklet has a narrow paper band or no narrow paper band. The number of manuscript data is determined using these pieces of information and the table. The settings of "jacket" and "narrow paper band" are just examples, and the settings may be any other information identifying the printing products.

As described above, the order content section (information identifying printing products included in order data) can be used to determine the number of manuscript data without using a manuscript transmission command.

Second Modified Example

In the second modified example, the status of the manuscript data is determined by using the number of manuscript data directly input to an external system.

Some of printing agents may be unable to complete an order job in one system. For example, the electronic transaction data may be used only to communicate information of the print settings of the product to be produced, and an estimate of cost and the number of manuscript data may be communicated between the customer and the printing agent by using mail, telephone, facsimile, or the like. In this case, the number of manuscript data related to the order is input to an external system (not shown). Although a commercially available program such as spreadsheet software or database software is often used as the external system, the external system may be another system provided in a printing agent.

Figure 13A:
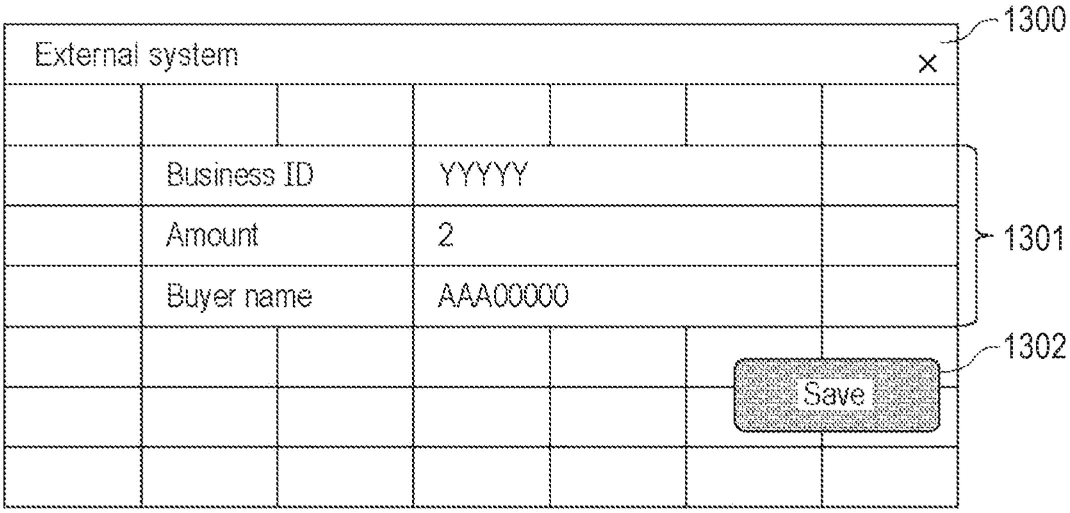
FIG. 13A is a schematic diagram of an external system according to a second modified example.
Figure 13B:
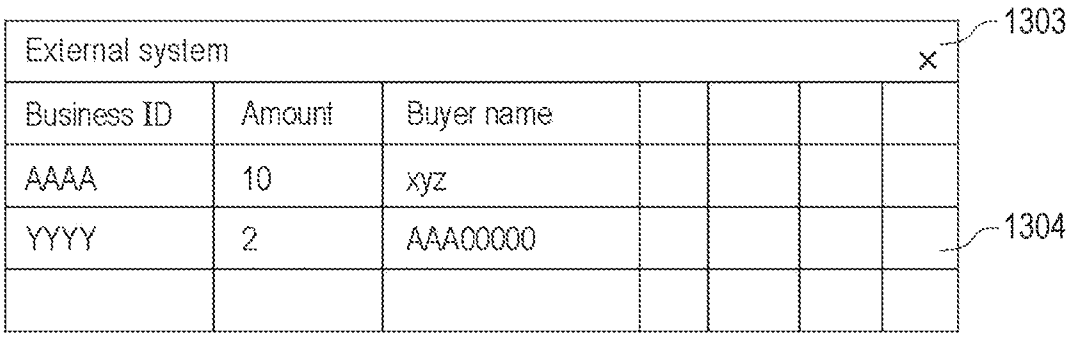
FIG. 13B is a schematic diagram of an external system according to the second modified example.

FIGS. 13A and 13B are schematic diagrams of an external system, and spreadsheet software is used as an example of the external system. FIG. 13A shows an example of a screen 1300 used for inputting manuscript information. Information included in the manuscript information section 904 shown in FIG. 9B is input in cells 1301. For example, the information may include a Business ID that identifies a series of electronic data being dealt, information for identifying a customer involved in the order, and the total number (Amount) of manuscript data. When the save button 1302 is pressed, a row 1304 is added to a manuscript information list 1303 shown in FIG. 13B.

Figure 10B:
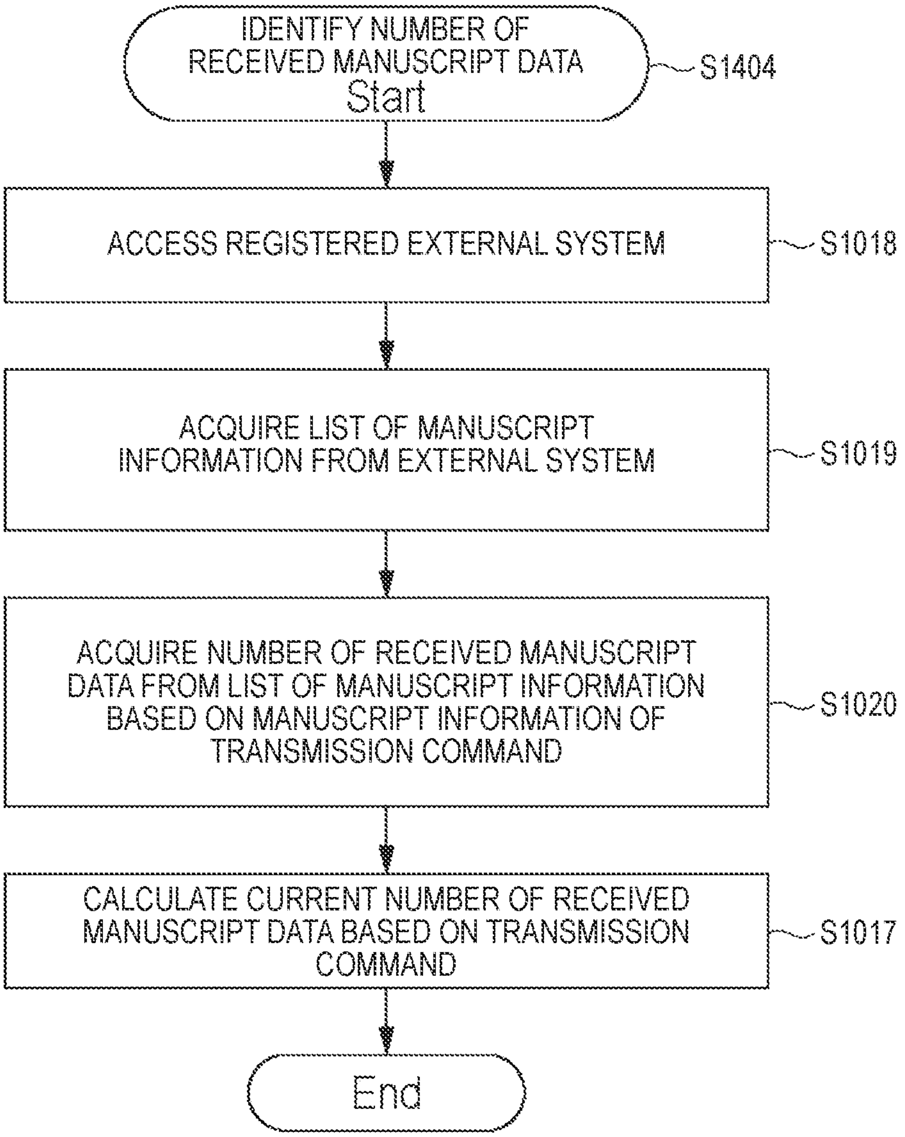
FIG. 10B shows a detailed flowchart of a modified example of step S1405.

FIG. 10B is a flowchart specifically showing the processing according to the second modified example with respect to step S1404 of FIG. 14.

When it is determined in step S1402 that the total number of manuscript data is not described in a manuscript transmission command, the following processing is executed in step S1404.

In step S1018, the manuscript data verifying unit 1104 accesses an external system registered in advance in the printing agent system. For example, in case where an endpoint and login information of the external system are described in a setting file, the manuscript data verifying unit 1104 accesses the external system using the above information.

In step S1019, the manuscript data verifying unit 1104 calls an API (Application Programming Interface) released by the external system, and acquires the total number of manuscript data. For example, the manuscript data verifying unit 1104 accesses a manuscript information list shown in FIG. 13B to acquire the total number of manuscript data associated with each Business ID. A manuscript data list 917 shown in FIG. 9G shows an example of data acquired from the external system. The data may have the JSON format or the XML format. In this example, the list of manuscript data is expressed using the JSON format. A description 918 corresponds to the row 1304 of FIG. 13B.

In step S1020, the manuscript data verifying unit 1104 uses the Business ID included in the manuscript transmission command 806 of FIG. 9E processed in step S1402 as a key to identify the total number of corresponding manuscript data from the manuscript information list. In this example, the Business ID described in the manuscript transmission command 806 is "YYYY" so that the information of the row 1304 is specified from the manuscript information list 1303 shown in FIG. 13B, and the total number of manuscript data is acquired from the information.

In step S1017, the manuscript data verifying unit 1104 calculates the number of currently accepted data based on the manuscript data specifying section 913.

As described above, the information to determine the total number of manuscript data can be acquired from an external system without using the manuscript transmission command.

The present invention allows to determine whether or not all manuscript data have been received.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:

at least one processor and at least a memory having instructions stored thereon, with the instructions being executed by the at least one processor to:

receive a predetermined command including:

manuscript data associated with order data that is used for producing a printing product;

information indicating the number of pieces of manuscript data that have already been received; and information indicating the number of pieces of manuscript data to be received;

determine, based on the information indicating the number of pieces of manuscript data that have already been received and the information indicating the number of pieces of manuscript data to be received included in the received predetermined command, whether all of the manuscript data associated with the order data have been received; and perform control to produce a printing product based on the order data and the received manuscript data in a case where it is determined that all of the manuscript data associated with the order data have been received based on the information indicating the number of pieces of manuscript data that have already been received and the information indicating the number of pieces of manuscript data to be received included in the received predetermined command.

2. The information processing apparatus according to claim 1, wherein the instructions are further executed to hold a table that links information identifying a print product with the number of pieces of manuscript data; and acquire the number of pieces of manuscript data to be received in association with the order data based on the table and the information identifying a printing product included in the order data.

3. The information processing apparatus according to claim 1, wherein the instructions are further executed to transmit information depending on a determined result.

4. The information processing apparatus according to claim 1, wherein, in a case where the information indicating the number of pieces of manuscript data to be received is updated before receiving all of the manuscript data to be received, the instructions are further executed to determine, based on the information indicating the number of pieces of manuscript data that have already been received and information indicating the updated number of pieces of manuscript data to be received, whether all of the manuscript data associated with the order data have been received; and wherein, in a case where it is determined based on the information indicating the number of pieces of manuscript data that have already been received and the information indicating the updated number of pieces of manuscript data to be received that all of the manuscript data associated with the order data have been received, the instructions are further executed to perform control to produce a printing product based on the order data and the received manuscript data.

5. The information processing apparatus according to claim 4, wherein, in a case where it is determined based on the information indicating the number of pieces of manuscript data that have already been received and the information indicating the updated number of pieces of manuscript data to be received that all of the manuscript data associated with the order data have been received, the instructions are further executed to transmit information indicating that the reception of all of the manuscript data has been completed and no further manuscript data can be received.

6. The information processing apparatus according to claim 4, wherein, in a case where it is determined based on the information indicating the number of pieces of manuscript data that have already been received and the information indicating the updated number of pieces of manuscript data to be received that all of the manuscript data associated with the order data have not been received yet, the instructions are further executed to transmit information indicating that there is the manuscript data that have not been received yet.

7. The information processing apparatus according to claim 6, wherein the instructions are further executed to transmit information indicating that further manuscript data can be received along with the information indicating that there is the manuscript data that have not been received yet.

8. The information processing apparatus according to claim 1, wherein, in a case where the predetermined command does not include the information indicating the number of pieces of manuscript data to be received, the instructions are further executed to determine that the reception of all of the manuscript data has been completed based on receipt of a completion command indicating that a process of receiving the manuscript data has been completed.

9. The information processing apparatus according to claim 1, wherein the instructions are further executed to determine that all of the manuscript data associated with the order data have been received based on correspondence between the information indicating the number of pieces of manuscript data that have already been received and the information indicating the number of pieces of manuscript data to be received included in the received predetermined command.

10. The information processing apparatus according to claim 4, wherein the instructions are further executed to determine that all of the manuscript data associated with the order data have been received based on correspondence between the information indicating the number of pieces of manuscript data that have already been received and the information indicating the updated number of pieces of manuscript data to be received included in the received predetermined command.

11. The information processing apparatus according to claim 1, wherein the predetermined command is transmitted from an information processing device of a sender of the manuscript data, the information processing device being different from the information processing apparatus, and wherein the information indicating the number of pieces of manuscript data to be received included in the predetermined command is specified at the information processing device of the sender.

12. The information processing apparatus according to claim 1, wherein the predetermined command is transmitted from a plurality of information processing devices corresponding to a plurality of senders of manuscript data.

13. The information processing apparatus according to claim 1, wherein the instructions are further executed to:

determine whether a preflight process for the received manuscript data has been successful, and transmit information for rejecting the manuscript data when determined that the preflight process for the received manuscript data has been unsuccessful.

14. A control method for an information processing apparatus, the control method comprising:

a receiving step for receiving a predetermined command including:

manuscript data associated with order data that is used for producing a printing product;

information indicating the number of pieces of manuscript data that have already been received; and information indicating the number of pieces of manuscript data to be received;

a determining step for determining, based on the information indicating the number of pieces of manuscript data that have already been received and the information indicating the number of pieces of manuscript data to be received included in the received predetermined command, whether all of the manuscript data associated with the order data have been received, and performing control to produce a printing product based on the order data and the received manuscript data in a case where it is determined that all of the manuscript data associated with the order data have been received based on the information indicating the number of pieces of manuscript data that have already been received and the information indicating the number of pieces of manuscript data to be received included in the received predetermined command.

15. The control method according to claim 14, further comprising:

a holding step for holding a table that links information identifying a print product with the number of pieces of manuscript data; and an acquiring step for acquiring the number of pieces of manuscript data to be received in association with the order data based on the table and the information identifying a printing product included in the order data.

16. The control method according to claim 14, further comprising a transmitting step transmitting information depending on a result determined by the determining step.

17. A non-transitory computer-readable storage medium storing a program that, when executed by a computer, causes the computer to:

receive a predetermined command including:

manuscript data associated with order data that is used for producing a printing product;

information indicating the number of pieces of manuscript data that have already been received; and information indicating the number of pieces of manuscript data to be received;

determine, based on the information indicating the number of pieces of manuscript data that have already been received and the information indicating the number of pieces of manuscript data to be received included in the received predetermined command, whether all of the manuscript data associated with the order data have been received, and performing control to produce a printing product based on the order data and the received manuscript data in a case where it is determined that all of the manuscript data associated with the order data have been received based on the information indicating the number of pieces of manuscript data that have already been received and the information indicating the number of pieces of manuscript data to be received included in the received predetermined command.

* * * * *